US012699365B2

(12) United States Patent
Yeo

(10) Patent No.: US 12,699,365 B2
(45) Date of Patent: Aug. 4, 2026

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventor: Haedong Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 378 days.

(21) Appl. No.: 18/222,768

(22) Filed: Jul. 17, 2023

(65) Prior Publication Data

US 2023/0418244 A1      Dec. 28, 2023

Related U.S. Application Data

(63) Continuation of application No. PCT/KR2023/005192, filed on Apr. 17, 2023.

(30) Foreign Application Priority Data

Jun. 23, 2022      (KR) ......................... 10-2022-0077160
Oct. 4, 2022      (KR) ......................... 10-2022-0126501

(51) Int. Cl.
*H05B 6/06*            (2006.01)
*G05B 13/02*            (2006.01)
(52) U.S. Cl.
CPC .................................. *G05B 13/027* (2013.01)
(58) Field of Classification Search
CPC ........ G05B 13/027; A47J 36/32; F24C 7/082; H05B 6/06
See application file for complete search history.

(56) References Cited

U.S. PATENT DOCUMENTS 11,037,029 B2 * 6/2021 Jiang ....................... G06V 10/17
11,182,314 B1 * 11/2021 Borkovic ................ G06F 13/10
(Continued)

FOREIGN PATENT DOCUMENTS

CN            113048529 A      6/2021
DE      10 2019 130 383 A1      5/2021
(Continued)

OTHER PUBLICATIONS

International Search Report dated Jul. 13, 2023, issued by the International Searching Authority in International Application No. PCT/KR2023/005192 (PCT/ISA/210).
(Continued)

*Primary Examiner* — Scott T Baderman
*Assistant Examiner* — Mario M Velez-Lopez
(74) *Attorney, Agent, or Firm* — Sughrue Mion, PLLC

(57) ABSTRACT

An electronic device includes: at least one processor that may obtain recipe information corresponding to a selected cooking menu. The at least one processor may identify a first cooking step and at least one cooking step to be performed after the first cooking step. The at least one processor may load at least one first neural network model corresponding to the first cooking step and the at least one cooking step to be performed after the first cooking step. The at least one processor may obtain context information on a cooking situation included in sensing data by inputting the sensing data to the at least one first neural network model, and control an operation of the electronic device based on the recipe information and the context information. The at least one processor may load at least one second neural network based on detecting a neural network model change event.

18 Claims, 24 Drawing Sheets

(56) References Cited

U.S. PATENT DOCUMENTS

| | | | | |
|---|---|---|---|---|
| 11,531,891 | B2 | 12/2022 | Maeng | |
| 11,622,651 | B2 | 4/2023 | Jung et al. | |
| 11,889,948 | B2 | 2/2024 | Maeng | |
| 2004/0128003 | A1* | 7/2004 | Frampton | G05B 15/02 |
| | | | | 700/31 |
| 2013/0204416 | A1* | 8/2013 | Takahashi | G05B 19/418 |
| | | | | 700/95 |
| 2016/0067866 | A1* | 3/2016 | Sekar | A47J 44/00 |
| | | | | 99/348 |
| 2017/0224161 | A1* | 8/2017 | Li | A47J 37/1266 |
| 2018/0081613 | A1* | 3/2018 | Masuike | G09G 5/003 |
| 2019/0034780 | A1 | 1/2019 | Marin et al. | |
| 2019/0053332 | A1* | 2/2019 | Cheng | F24C 7/046 |
| 2020/0117954 | A1 | 4/2020 | Jiang et al. | |
| 2021/0118447 | A1* | 4/2021 | Kim | G06V 20/20 |
| 2021/0137310 | A1 | 5/2021 | Shim | |
| 2021/0182667 | A1* | 6/2021 | Maeng | F24C 7/085 |
| 2021/0209465 | A1 | 7/2021 | Maeng | |
| 2021/0251263 | A1* | 8/2021 | Knighton | A23L 5/10 |
| 2021/0366033 | A1* | 11/2021 | Yamamoto | G06F 3/04847 |
| 2021/0387350 | A1* | 12/2021 | Oleynik | A47J 44/00 |
| 2022/0047109 | A1 | 2/2022 | Bhogal et al. | |
| 2023/0108444 | A1 | 4/2023 | Shin et al. | |

FOREIGN PATENT DOCUMENTS

| | | | | |
|---|---|---|---|---|
| DE | 102019130383 | | * | 5/2021 |
| KR | 10-1978722 | B1 | | 8/2019 |
| KR | 10-2021-0056173 | A | | 5/2021 |
| KR | 10-2021-0074648 | A | | 6/2021 |
| KR | 10-2021-0088315 | A | | 7/2021 |
| KR | 10-2021-0092023 | A | | 7/2021 |
| KR | 10-2021-0106685 | A | | 8/2021 |
| KR | 10-2327845 | B1 | | 11/2021 |
| KR | 10-2400018 | B1 | | 5/2022 |
| KR | 10-2022-0078830 | A | | 6/2022 |
| WO | 2022/025527 | A1 | | 2/2022 |
| WO | WO2022025527 | | * | 2/2022 |

OTHER PUBLICATIONS

Written Opinion dated Jul. 13, 2023, issued by the International Searching Authority in counterpart International Application No. PCT/KR2023/005192 (PCT/ISA/237).

Communication dated May 14, 2025, issued by the European Patent Office in counterpart European Application No. 23827345.2.

Communication dated Feb. 3, 2026, issued by the European Patent Office in European Application No. 23827345.2.

* cited by examiner

FIG. 4B

| COOKING STEP | NEURAL NETWORK MODEL | META DATA |
|---|---|---|
| ... | | |
| FIRST COOKING STEP | FIRST OBJECT RECOGNITION MODEL | {IMAGE}, {PAN}, |
| | SECOND OBJECT RECOGNITION MODEL | {IMAGE}, {ONION, MUSHROOM, GARLIC} |
| | FIRST ACTION RECOGNITION MODEL | {IMAGE}, {VEGETABLE},{ACTION OF PUTTING} |
| SECOND COOKING STEP | THIRD OBJECT RECOGNITION MODEL | {IMAGE}, {ONION STATE CHANGE} |
| | SECOND ACTION RECOGNITION MODEL | {IMAGE},{ACTION OF STIR-FRYING} |
| | FIRST SOUND RECOGNITION MODEL | {SOUND}, {SOUND OF STIR-FRYING ONION} |
| ... | | |

IDENTIFY FIRST COOKING STEP INCLUDED IN RECIPE INFORMATION ~S510

OBTAIN INFORMATION ON PROBABILITY THAT COOKING STEPS ARE PERFORMED AFTER FIRST COOKING STEP ~S520

IDENTIFY AT LEAST ONE COOKING STEP AMONG NEXT COOKING STEPS AFTER FIRST COOKING STEP ON BASIS OF PROBABILITY ~S530

FIG. 10

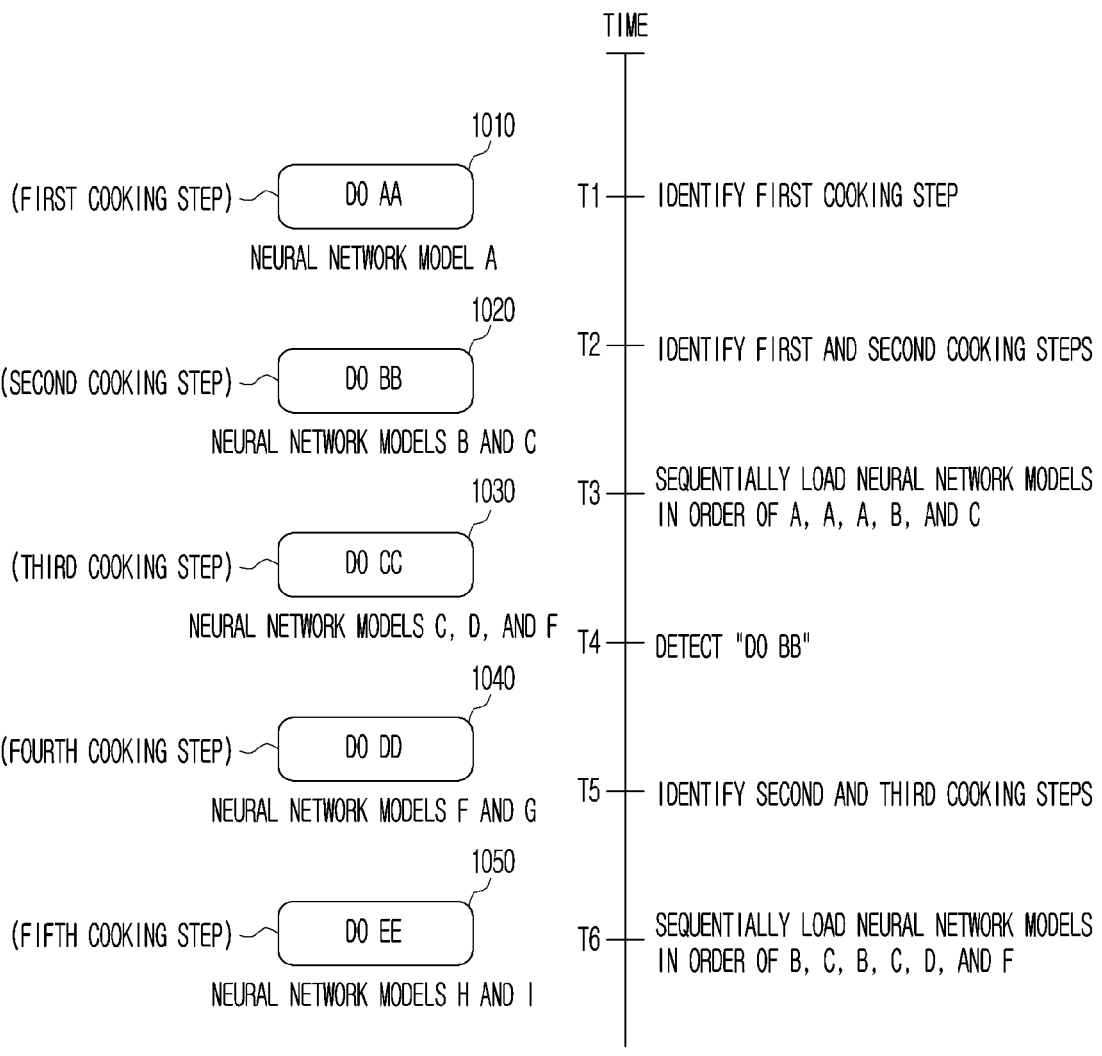

TIME (FIRST COOKING STEP) ⌐ 1010 DO AA
NEURAL NETWORK MODEL A

T1 — IDENTIFY FIRST COOKING STEP (SECOND COOKING STEP) ⌐ 1020 DO BB
NEURAL NETWORK MODELS B AND C

T2 — IDENTIFY FIRST AND SECOND COOKING STEPS (THIRD COOKING STEP) ⌐ 1030 DO CC
NEURAL NETWORK MODELS C, D, AND F

T3 — SEQUENTIALLY LOAD NEURAL NETWORK MODELS IN ORDER OF A, A, A, B, AND C

T4 — DETECT "DO BB"

(FOURTH COOKING STEP) ⌐ 1040 DO DD
NEURAL NETWORK MODELS F AND G

T5 — IDENTIFY SECOND AND THIRD COOKING STEPS (FIFTH COOKING STEP) ⌐ 1050 DO EE
NEURAL NETWORK MODELS H AND I

T6 — SEQUENTIALLY LOAD NEURAL NETWORK MODELS IN ORDER OF B, C, B, C, D, AND F

FIG. 12

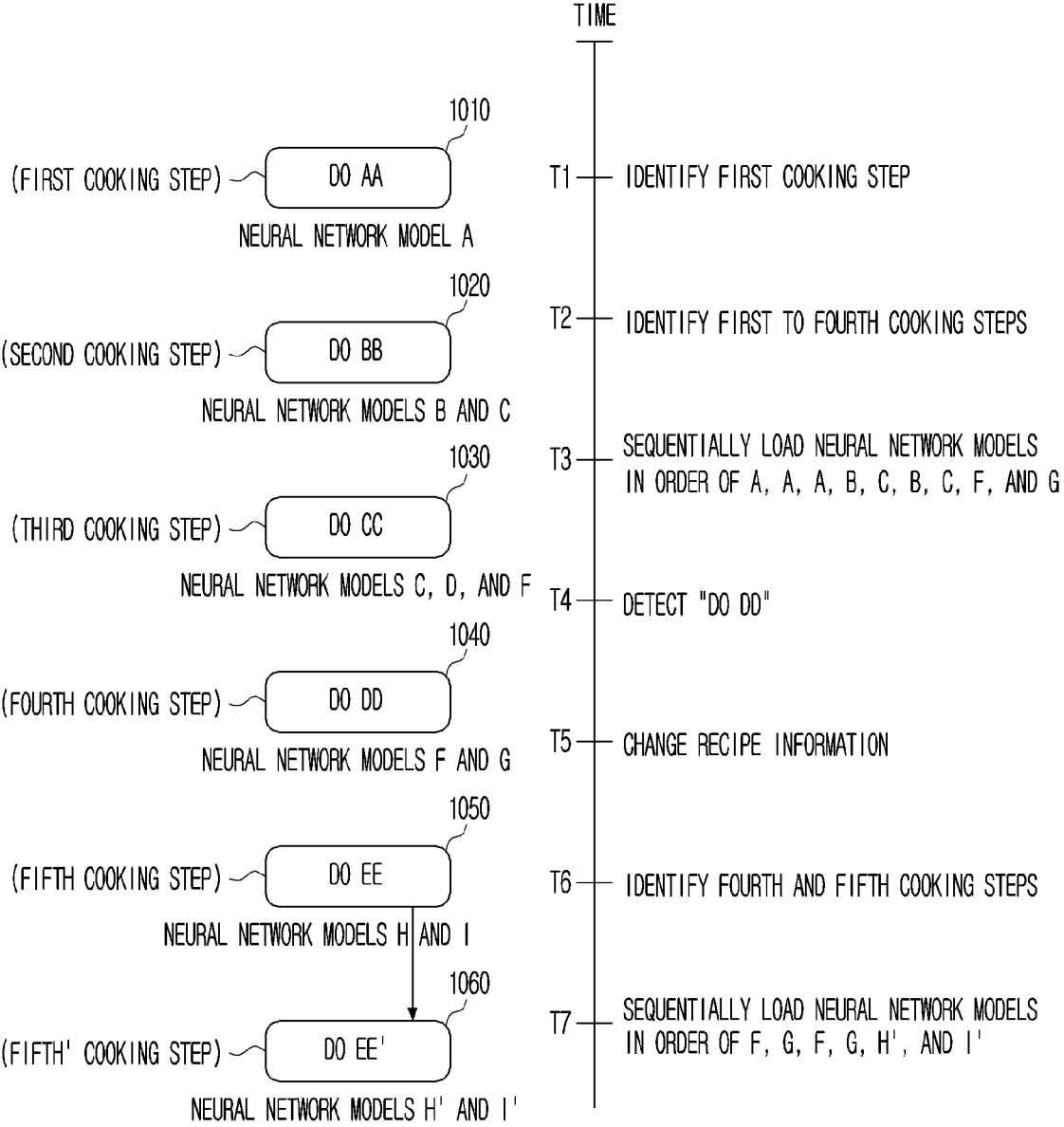

TIME (FIRST COOKING STEP) — DO AA  1010
NEURAL NETWORK MODEL A

T1 — IDENTIFY FIRST COOKING STEP (SECOND COOKING STEP) — DO BB  1020
NEURAL NETWORK MODELS B AND C

T2 — IDENTIFY FIRST TO FOURTH COOKING STEPS (THIRD COOKING STEP) — DO CC  1030
NEURAL NETWORK MODELS C, D, AND F

T3 — SEQUENTIALLY LOAD NEURAL NETWORK MODELS IN ORDER OF A, A, A, B, C, B, C, F, AND G

T4 — DETECT "DO DD"

(FOURTH COOKING STEP) — DO DD  1040
NEURAL NETWORK MODELS F AND G

T5 — CHANGE RECIPE INFORMATION (FIFTH COOKING STEP) — DO EE  1050
NEURAL NETWORK MODELS H AND I

T6 — IDENTIFY FOURTH AND FIFTH COOKING STEPS (FIFTH' COOKING STEP) — DO EE'  1060
NEURAL NETWORK MODELS H' AND I'

T7 — SEQUENTIALLY LOAD NEURAL NETWORK MODELS IN ORDER OF F, G, F, G, H', AND I'

1710

ELECTRONIC DEVICE AND CONTROLLING METHOD OF ELECTRONIC DEVICE

CROSS-REFERENCE TO RELATED APPLICATION(S)

This application is a continuation of PCT/KR2023/005192, filed on Apr. 17, 2023, at the Korean Intellectual Property Receiving Office and claims priority under 35 U.S.C. § 119 to Korean Patent Application No. 10-2022-0077160, filed on Jun. 23, 2022, and Korean Patent Application No. 10-2022-0126501, filed on Oct. 4, 2022, in the Korean Intellectual Property Office, the disclosures of all of which are incorporated by reference herein in their entireties.

BACKGROUND

1. Field

The disclosure relates to an electronic device and a controlling method of an electronic device, and more particularly, to an electronic device operated based on sensor information, and a controlling method of an electronic device.

2. Description of Related Art

The usage of an electric cooktop or an electric stove has increased recently, leading to accelerated advance in technology for automatically controlling a device such as the cooktop. These advancements include recent developments in artificial intelligence (AI)-related technology and internet of things (IoT)-related technology.

In the related art, there exists technology for automatically controlling the cooktop by using an image of the cooktop. However, the related art technologies fail to effectively perform a control required for each step of a recipe by comprehensively considering various information on a current cooking situation.

For example, related art technologies fail to automatically control the cooktop in consideration of a case where the recipe of a cooking menu is changed based on a type of cookware selected by a user or the user's cooking history.

Furthermore, related art technologies fail to consider a method of selectively loading or selectively using a specific neural network model among a plurality neural network models for each cooking step necessary for performing proper cooking based on the current cooking situation.

SUMMARY

According to an aspect of the disclosure, an electronic device includes: at least one sensor; a memory storing a plurality of neural network models; and at least one processor configured to: based on reception of a user input for selection of a cooking menu, obtain recipe information corresponding to the cooking menu identify, from among the a plurality of cooking steps included in the recipe information, a first cooking step and at least one cooking step to be performed after the first cooking step, load, in response to the recipe information and a resource of the electronic device, at least one first neural network model among the plurality of neural network models, the at least one first neural network model corresponding to the first cooking step and the at least one cooking step to be performed after the first cooking step, obtain sensing data from the at least one sensor, the sensing data corresponding to at least the first cooking step, obtain context information on a cooking situation indicated in the sensing data by inputting the sensing data to the at least one first neural network model, control an operation of the electronic device based on the recipe information and the context information, detect a neural network model change event based on the context information, and in response to detection of the neural network model change event, load at least one second neural network model among the plurality of neural network models based on the context information and resource information of the electronic device.

The neural network model change event corresponds to an event in which performance of a second cooking step different from the first cooking step is detected, and the at least one processor may be further configured to: identify, based on the context information, the second cooking step and the at least one cooking step to be performed after the second cooking step among the plurality of cooking steps included in the recipe information, and load, based on the recipe information and the resource of the electronic device, the at least one second neural network model among the plurality of neural network models, the at least one second neural network model corresponding to the second cooking step and the at least one cooking step to be performed after the second cooking step.

The at least one processor may be further configured to: determine whether to change the recipe information based on the context information and the recipe information, in response to determining that the recipe information is changed, obtain changed recipe information, identify a third cooking step and the at least one cooking step to be performed after the third cooking step among the plurality of cooking steps included in the changed recipe information, based on the context information, and load, based on the changed recipe information and the resource of the electronic device, at least one third neural network model among the plurality of neural network models, the at least one third neural network model corresponding to the third cooking step and the at least one cooking step to be performed after the third cooking step.

The at least one processor may be further configured to: determine whether an intermediate cooking step exists between the first cooking step and the second cooking step, in response to determining that no intermediate cooking step exists between the first cooking step and the second cooking step, determine that the recipe information is not changed, in response to determining that the intermediate cooking step exists between the first cooking step and the second cooking step, determine whether the intermediate cooking step between the first cooking step and the second cooking step is a cooking step related to a next cooking step after the second cooking step, and in response to determining that the cooking step between the first cooking step and the second cooking step is the cooking step related to the next cooking step after the second cooking step, determine that the recipe information is changed.

The neural network model change event may correspond to detection of a new cookware not included in the recipe information, and the at least one processor may be further configured to: based on the detection of the new cookware not included in the recipe information, change the recipe information based on the new cookware, and load, based on the changed recipe information and the resource of the electronic device, at least one fourth neural network model among the plurality of neural network models, the at least one fourth neural network model corresponding to a fourth cooking step and the at least one cooking step to be performed after the fourth cooking step.

The at least one processor may be further configured to: identify the first cooking step included in the recipe information, obtain information on a probability that one or more cooking steps are performed after the first cooking step based on the recipe information, and identify the at least one cooking step among next cooking steps after the first cooking step, based on the information on the probability that the one or more cooking steps are performed after the first cooking step.

The recipe information may include a knowledge graph showing a recipe corresponding to the selected cooking menu, the knowledge graph may include a plurality of nodes representing the plurality of cooking steps for completing the cooking menu based on the recipe and a plurality of edges representing a sequential relationship between the plurality of cooking steps, and the at least one processor may be further configured to obtain the information on the probability that the one or more cooking steps are performed after the first cooking step based on a distance between a node representing the first cooking step and nodes representing the next cooking steps after the first cooking step.

The at least one processor may be further configured to, in response to a determination that a plurality of first neural network models exist: identify a resource required to execute each of the plurality of first neural network models, and determine a number of neural network models among the plurality of first neural network models to be simultaneously loaded, based on the resource of the electronic device and the resource required to execute each of the plurality of first neural network models, each first neural network model of the plurality of first neural network models may correspond to the first cooking step and the at least one cooking step to be performed after the first cooking step, and the plurality of first neural network models may be included in the plurality of neural network models.

The at least one processor may be further configured to: determine a weight value of each of the plurality of first neural network models based on the information on a probability that the at least one cooking step is performed after the first cooking step; sequentially load each of the plurality of first neural network models based on the determined weight values; and obtain the context information on the cooking situation indicated in the sensing data by inputting the sensing data to the plurality of sequentially loaded first neural network models.

The at least one sensor may include an illuminance sensor for sensing an illuminance value around the electronic device, and the at least one processor is configured to load the at least one first neural network model among the plurality of neural network models, the at least one first neural network model corresponding to the first cooking step and the at least one cooking step to be performed after the first cooking step, based on at least one of a type of the at least one sensor and the illuminance value obtained from the illuminance sensor.

According to an aspect of the disclosure, a method of controlling an electronic device, includes: in response to receiving a user input selecting a cooking menu, obtaining recipe information corresponding to the cooking menu; identifying, from among a plurality of cooking steps included in the recipe information, a first cooking step and at least one cooking step to be performed after the first cooking step; loading, based on the recipe information and a resource of the electronic device, at least one first neural network model among a plurality of neural network models, the at least one first neural network model corresponding to the first cooking step and the at least one cooking step to be performed after the first cooking step; obtaining sensing data from at least one sensor, the sensing data corresponding to at least the first cooking step; obtaining context information on a cooking situation indicated in sensing data by inputting the sensing data to the at least one first neural network model; controlling an operation of the electronic device based on the recipe information and the context information; detecting a neural network model change event based on the context information; and in response to detection of the neural network model change event, loading at least one second neural network model among the plurality of neural network models based on the context information and resource information of the electronic device.

The neural network model change event may correspond to an event in which performance of a second cooking step different from the first cooking step is detected, and the loading of the at least one second neural network model may include: identifying, based on the context information, the second cooking step and the at least one cooking step to be performed after the second cooking step among the plurality of cooking steps included in the recipe information; and loading, based on the recipe information and the resource of the electronic device, the at least one second neural network model among the plurality of neural network models, the at least one second neural network model corresponding to the second cooking step and the at least one cooking step to be performed after the second cooking step.

The loading the at least one second neural network model may include: determining whether to change the recipe information based on the context information and the recipe information; in response to determining that the recipe information is changed, obtaining changed recipe information; identifying, based on the context information, a third cooking step and the at least one cooking step to be performed after the third cooking step among the plurality of cooking steps included in the changed recipe information; and loading, based on the changed recipe information and the resource of the electronic device, at least one third neural network model among the plurality of neural network models, the at least one third neural network model corresponding to the third cooking step and the at least one cooking step to be performed after the third cooking step.

The determining whether to change the recipe information may include: determining whether an intermediate cooking step exists between the first cooking step and the second cooking step; in response to determining that no intermediate cooking step exists between the first cooking step and the second cooking step, determining that the recipe information is not changed; in response to determining that the intermediate cooking step exists between the first cooking step and the second cooking step, determining whether the intermediate cooking step between the first cooking step and the second cooking step is a cooking step related to a next cooking step after the second cooking step; and in response to determining that the cooking step between the first cooking step and the second cooking step is the cooking step related to the next cooking step after the second cooking step, determine that the recipe information is changed.

The neural network model change event corresponds to a detection of a new cookware not included in the recipe information, and the loading the at least one second neural network model may include: based on the detection of the new cookware not included in the recipe information, changing the recipe information based on the new cookware; and loading, in response to the changed recipe information and the resource of the electronic device, at least one fourth neural network model among the plurality of neural network models, the at least one fourth neural network model corresponding to a fourth cooking step and the at least one cooking step to be performed after the fourth cooking step.

According to an aspect of the disclosure, an electronic device includes: at least one sensor; a memory storing a plurality of neural network models; and at least one processor configured to: in response to reception of a user input selecting a cooking menu, obtain recipe information corresponding to the cooking menu, identify a first cooking step and at least one cooking step to be performed after the first cooking step among a plurality of cooking steps included in the recipe information, load, based on the recipe information and a resource of the electronic device, at least one first neural network model among the plurality of neural network models, the at least one first neural network model corresponding to the first cooking step and the at least one cooking step to be performed after the first cooking step, obtain sensing data from the at least one sensor, the sensing data corresponding to at least the first cooking step, obtain context information on a cooking situation indicated in the sensing data by inputting the sensing data to the at least one first neural network model, and control an operation of the electronic device based on the recipe information and the context information.

The at least one processor may be further configured to: identify the first cooking step included in the recipe information, obtain information on a probability that one or more cooking steps are performed after the first cooking step based on the recipe information, and identify, based on the information on the probability that the one or more cooking steps are performed after the first cooking step, the at least one cooking step among next cooking steps after the first cooking step.

The recipe information may include a knowledge graph showing a recipe corresponding to the selected cooking menu, the knowledge graph may include a plurality of nodes representing the plurality of cooking steps for completing the cooking menu based on the recipe and a plurality of edges representing a sequential relationship between the plurality of cooking steps, and the at least one processor may be further configured to obtain the information on the probability that the one or more cooking steps are performed after the first cooking step based on a distance between a node representing the first cooking step and nodes representing the next cooking steps after the first cooking step.

The at least one processor is configured to, in response to a determination that a plurality of first neural network models exist: identify a resource required to execute each of the plurality of first neural network models, and determine a number of neural network models among the plurality of first neural network models to be simultaneously loaded, based on the resource of the electronic device and the resource required to execute each of the plurality of first neural network models, each first neural network model in the plurality of first neural network models may correspond the first cooking step and the at least one cooking step to be performed after the first cooking step, and the plurality of first neural network models are included in the plurality of neural network models.

The at least one processor may be further configured to: determine a weight value of each of the plurality of first neural network models based on the information on a probability that the at least one cooking step is performed after the first cooking step; sequentially load each of the plurality of first neural network models based on the deter-mined weight values; and obtain the context information on the cooking situation indicated in the sensing data by inputting the sensing data to the plurality of sequentially loaded first neural network models.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4B is a view illustrating information on the neural network model included in the recipe information, according to one or more embodiments of the disclosure;

FIGS. 10, 11, 12, 13 and 14 are views illustrating various examples of dynamically loading the neural network model based on the neural network model change event, according to one or more embodiments of the disclosure;

DETAILED DESCRIPTION

Figure 1:
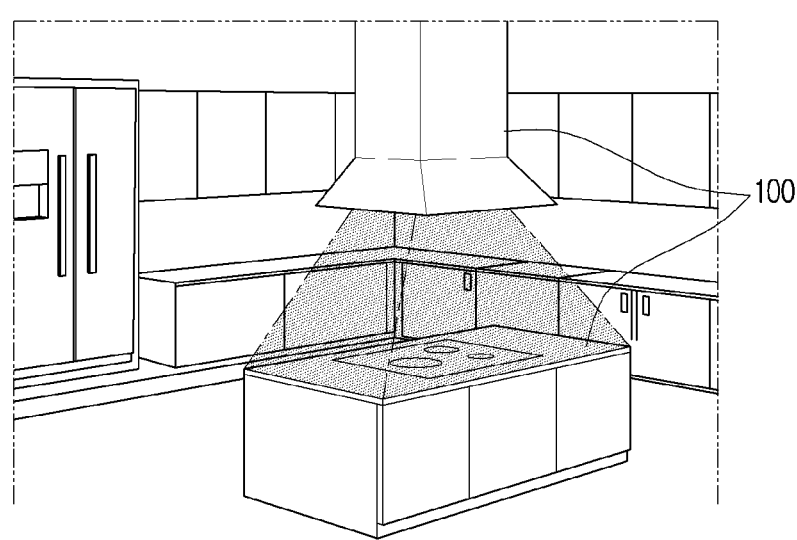
FIG. 1 is a view showing an appearance of an electronic device, according to one or more embodiments of the disclosure.

The disclosure may be variously modified and have various embodiments, and specific embodiments of the disclosure are thus shown in the drawings and described in detail in the detailed description. However, it is to be understood that the scope of the disclosure is not limited to the specific embodiments, and includes various modifications, equivalents or alternatives according to the embodiments of the disclosure. Throughout the accompanying drawings, similar components are denoted by similar reference numerals.

In describing the disclosure, the description omits a detailed description of a case where the detailed description for the known functions or configurations related to the disclosure is determined to unnecessarily obscure the gist of the disclosure.

Furthermore, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. A term of a singular number may include its plural number unless explicitly represented otherwise in the context.

In the disclosure, an expression "have," "may have," "include," "may include" or the like, represents existence of a corresponding feature (for example, a numerical value, a function, an operation or a component such as a part), and does not exclude existence of an additional feature.

In the disclosure, expressions "A or B," "least one of A and/or B," "one or more of A and/or B" and the like, may include all possible combinations of items enumerated together. For example, "A or B," "at least one of A and B" or "at least one of A or B" may represent all of 1) a case where only A is included, 2) a case where only B is included, or 3) a case where both of A and B are included.

Expressions "first," "second" and the like, used in the disclosure may represent various components regardless of a sequence and/or importance of the components. These expressions are only used in order to distinguish one component from another components, and do not limit the corresponding components.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component).

On the other hand, in case that any component (for example, the first component) is mentioned to be "directly coupled to" or "directly connected to" another component (for example, the second component), it is to be understood that still other component (for example, the third component) is not present between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily represent "specifically designed to" in hardware.

Instead, an expression a device "configured to" in any situation may represent that the device may "perform" together with another device or component. For example, "a processor configured (or set) to perform A, B and C" may represent a dedicated processor (for example, an embedded processor) for performing corresponding operations or a general-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented in hardware or software, or be implemented by a combination of hardware and software. Furthermore, a plurality of "modules" or a plurality of "~ers/ors" may be integrated with each other in at least one module and implemented by at least one processor except for a "module" or an "~er/or" that needs to be implemented in specific hardware.

The drawings schematically show various elements and areas. Therefore, the spirit of the disclosure is not limited by relative sizes or intervals shown in the accompanying drawings.

The embodiments of the disclosure are described in detail with reference to the accompanying drawings so that those skilled in the art to which the disclosure pertains may easily practice the disclosure.

FIG. 1 is a view showing an appearance of an electronic device 100 according to one or more embodiments of the disclosure. As shown in FIG. 1, the electronic device 100 may be implemented as a kitchen appliance including a heater, such as a cooktop, a gas stove, an electric stove, or an oven. Furthermore, the electronic device 100 may further include a hood positioned above the heater to discharge smoke or odor to the outside in addition to the heater.

For example, based on receiving a user input for selecting a cooking menu, the electronic device 100 may obtain recipe information of the selected cooking menu. In one or more examples, the "recipe information" may include information on each step of a recipe to complete the cooking menu, and may include information on a plurality of cooking steps.

Furthermore, the electronic device 100 may obtain context information by using at least one sensor. For example, as shown in FIG. 1, the electronic device 100 may obtain sensing data collected through a camera or a microphone that is installed in the hood, where the sensing data is input to a neural network model to obtain context information. In one or more examples, the "context information" may include information on a current cooking situation indicated in the sensing data, and may include the type or state of a food ingredient indicated in the sensing data (e.g., image data or sound data), a type of cooking vessel, a surrounding environment (e.g., ambient brightness) of the electronic device 100, information on a user action, information on the heater, etc.

The electronic device 100 may control an operation of the electronic device 100 to perform the selected cooking menu based on the obtained recipe information and context information. For example, the electronic device 100 may control the heating temperature, heating time, and operation (on/off) of the heater based on the recipe information or the context information. The electronic device 100 may automatically perform these operations without input from a user.

In one or more examples, the electronic device 100 may load at least one neural network model to obtain the context information. However, the electronic device 100 in an on-device environment may be limited in resources and therefore, may be limited in simultaneously loading all of the plurality of neural network models required to perform the selected cooking menu. Furthermore, based on simultaneously loading all of the plurality of neural network models required to perform the selected cooking menu, the electronic device 100 may have a significantly reduced processing speed.

Therefore, according to one or more embodiments of the disclosure, the electronic device 100 may selectively load only the neural network model among the plurality of neural network models necessary for each cooking step based on at least one of the recipe information, resource information of the electronic device 100, and the context information on the cooking situation. Accordingly, the electronic device 100 may significantly reduce a resource for loading and processing the neural network model. That is, even when the electronic device 100 has insufficient memory capacity or processing capacity for simultaneously loading more than one neural network model, the electronic device 100 still may identify the cooking situation in real time by using the neural network model in the on-device environment, and perform a control corresponding to the identified cooking situation.

However, as understood by one of ordinary skill in the art, the implementation of the electronic device 100 as a kitchen appliance including the heater is a merely an example, and the electronic device 100 may be implemented as a hood, a user terminal (e.g., smartphone), or a server. For example, the electronic device 100 may be a device which may remotely control a heater of an external device connected to the electronic device 100. For example, the electronic device 100 may be implemented as a portable terminal such as the smartphone or a tablet personal computer (PC), a home appliance such as a television or a refrigerator or the server. In one or more examples, the electronic device 100 may control an operation of the external device through a communication connection with the external device including the heater.

Hereinafter, the description describes the electronic device 100 that may be operated based on the recipe information and the context information on the cooking situation, according to one or more embodiments of the disclosure in more detail with reference to the drawings.

Figure 2A:
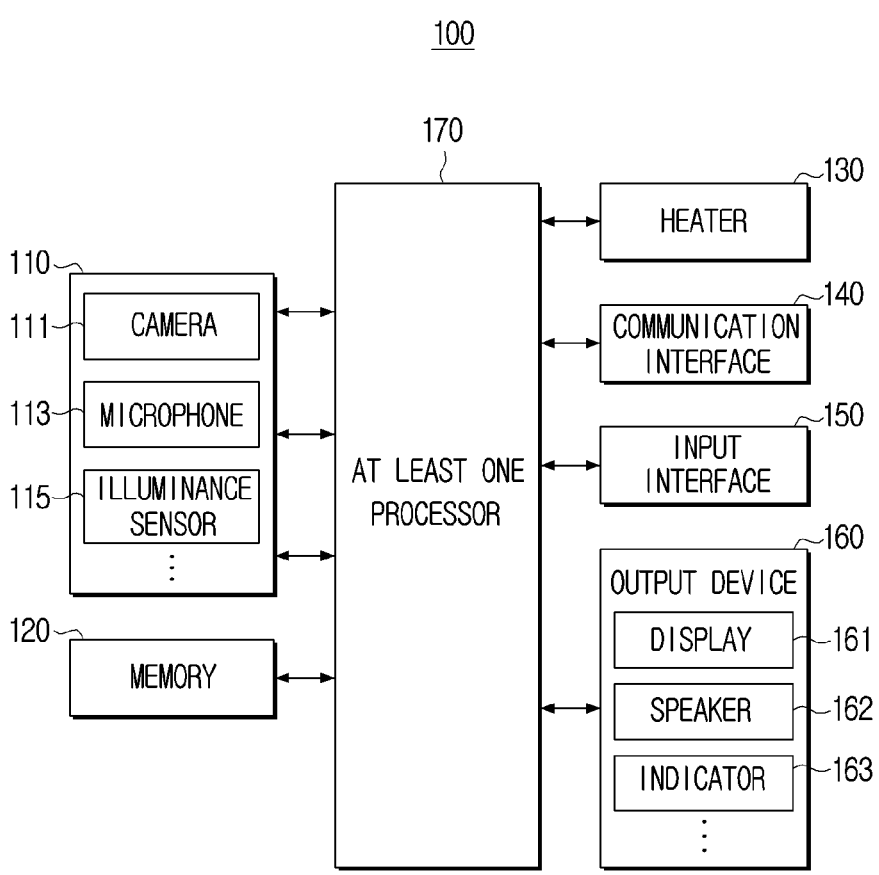
FIG. 2A is a block diagram including a configuration of the electronic device, according to one or more embodiments of the disclosure.

FIG. 2A is a block diagram including a configuration of the electronic device according to one or more embodiments of the disclosure. As shown in FIG. 2A, the electronic device 100 may include at least one sensor 110, a memory 120, a heater 130, a communication interface 140, an input interface 150, an output device 160, and at least one processor 170. While FIG. 2A shows that the electronic device 100 is implemented as the kitchen appliance including the cooktop and the hood, this configuration is only an example, and some components of the electronic device 100 may be deleted or added in an implementation example.

At least one sensor 110 may detect various information inside and outside the electronic device 100. In one or more examples, at least one sensor 110 according to the disclosure may include a camera 111, a microphone 113, and an illuminance sensor 115 as shown in FIG. 2A.

The camera 111 may obtain an image (or image data) of the inside and/or outside of the electronic device 100 through an image sensor. For example, the camera 111 may be positioned in the hood positioned above the heater 130 to capture the heater 130 of the electronic device 100 and a kitchen counter or a user positioned around the electronic device 100, and the plurality of cameras 111 may be positioned to capture a respective area of a plurality of areas. The image obtained through the camera 111 may be a top-view image or an image captured at an angle close to the top-view image. Furthermore, at least one model of the plurality of neural network models may perform learning based on the top-view image or the image captured at the angle close to the top-view image.

The microphone 113 may obtain sound (or sound data). In one or more examples, the microphone 113 may be positioned in the heater 130 or the hood. However, this configuration is only an example, and the microphone 113 may be positioned in one area in the kitchen while being electrically connected to the electronic device 100. In one or more examples, a plurality of microphones 113 may be positioned to collect the audio generated from a plurality of areas.

The illuminance sensor 115 may obtain illuminance data on illuminance of the surrounding environment of the electronic device 100.

While FIG. 2A shows that at least one sensor 110 includes a plurality of sensors, this configuration is only an example, and at least one sensor 110 may include only the camera 111, or only one microphone 113, or lonely one illuminance sensor 115. Furthermore, the at least one sensor 110 may further include various types of sensors such as a temperature sensor, a humidity sensor, an infrared sensor, and a biosensor.

According to one or more embodiments of the disclosure, at least one processor 170 may obtain the sensing data from the at least one sensor 110 and obtain the context information according to the disclosure by inputting the sensing data to at least one neural network model of the plurality of neural network models. For example, when the sensing data is the image data obtained through the camera 111, the at least one processor 170 may input the image data to an object recognition model, and obtain information on the food ingredients included in the image, and may further obtain information on a cookware used in preparing the cooking menu. Furthermore, the at least one processor 170 may input the image data to an action recognition model to obtain information on a user action indicated in the image. Furthermore, when the sensing data is the sound data obtained through the microphone 113, at least one processor 170 may input the sound data to a sound recognition model to obtain information on a type of sound included in the sound data. For example, the sound data may be correlated with a cooking situation such as frying an item or chopping vegetables.

The memory 120 may store at least one instruction for controlling the electronic device 100. Furthermore, the memory 120 may store an operating system (O/S) for driving the electronic device 100. Furthermore, the memory 120 may store various software programs or applications for operating the electronic device 100 according to the various embodiments of the disclosure. Furthermore, the memory 120 may include a semiconductor memory 120 such as a flash memory 120, or a magnetic storing medium such as a hard disk.

According to one or more embodiments, the memory 120 may store various software modules for operating the electronic device 100 according to the various embodiments of the disclosure, and at least one processor 170 may execute the various software modules stored in the memory 120 to control the operation of the electronic device 100. For example, the memory 120 may be accessed by the processor, and data may be read/written/modified/deleted/updated by the processor.

The memory 120 according to the disclosure may include a non-volatile memory and a volatile memory. In one or more examples, the non-volatile memory refers to a memory that may maintain stored information even in case that power supply is interrupted, and the volatile memory refers to a memory that requires continuous power supply to maintain the stored information. An expression "loading", according to the disclosure, may refer to an operation of loading and storing the data that is stored in the non-volatile memory in the volatile memory. The volatile memory according to the disclosure may not only be implemented as a separate component distinguished from at least one processor 170, but may also be implemented as one component of at least one processor 170.

Furthermore, the memory 120 may store data on the plurality of neural network models according to the disclosure. In particular, the non-volatile memory of the memory 120 may store the data on the plurality of neural network models according to the disclosure. Furthermore, the memory 120 may store the data on the plurality of neural network models received from an external server. While one neural network model may correspond to one cooking step, this configuration is only an example, and as understood by one of ordinary skill in the art, more than one neural network model may correspond to the cooking step. In one or more examples, when more than one neural network model corresponds to one cooking step, these neural network models may be referred to as a neural network model set or a neural network model group.

In one or more examples, the memory 120 may not store the plurality of neural network models, and may request at least one neural network model corresponding to the cooking step identified by the electronic device 100 from an external server. The memory 120 (e.g., volatile memory) may store the requested neural network model.

Furthermore, the memory 120 may store the recipe information, the sensing data, and the context information. Furthermore, the memory 120 may store user data according to the disclosure, information on a weight value assigned to the neural network model, and information on a probability that cooking steps are performed after a specific cooking step.

Furthermore, various information necessary for achieving the purpose of the disclosure may be stored in the memory 120, and the information stored in the memory 120 may be updated as it is received from a server or an external device, or input by a user.

The heater 130 may refer to a component configured to heat food or one or more items (e.g., ingredients) used in cooking the menu. For example, when the electronic device 100 is implemented as the electric stove, the heater 130 may generate heat by supplying power, and a heat source here may be a radiant heater or an induction heater. When the electronic device 100 is implemented as the gas stove, the heater 130 may generate heat by supplying gas. The heater 130 may be operated or the heating temperature and heating time of the heater 130 may be performed based on the user input, which may be performed by at least one processor 170 particularly in various embodiments of the disclosure. In one or more examples, the heater 130 may be automatically operated without user input.

Figure 2B:
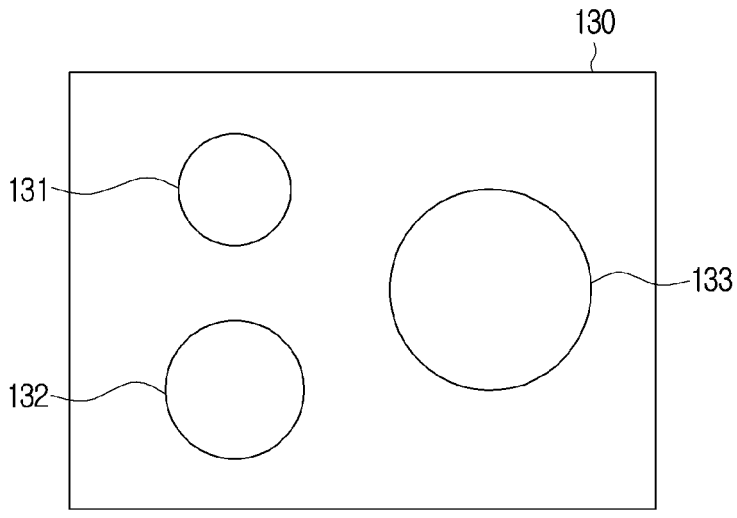
FIG. 2B is a view showing a heater, according to one or more embodiments of the disclosure.

In one or more examples, the heater 130 may include a plurality of burners 131, 132, and 133 as shown in FIG. 2B. In one or more examples, the burner may be implemented as an area for providing heat to the cookware, and the plurality of burners may be operated in different ways. For example, first and second burners 131 and 132 may be operated by a radiant heater method, and the third burner 133 may be operated by an induction heater method. Furthermore, the plurality of burners may also have different sizes. In one or more examples, at least one processor 170 may individually control each temperature, operation time, and operation mode of the plurality of burners 131, 132, and 133. For example, each of the plurality of burners 131, 132, and 133 may control a respective operation temperatures in a plurality of stages (e.g., first through ninth stages).

Furthermore, the heater 130 may include the oven or a microwave oven. In one or more examples, at least one sensor 110 may be positioned in the oven or the microwave oven to obtain the sensing data on a state of the food.

The communication interface 140 may include a circuit, and perform communication with the external device (e.g., server or user terminal). In one or more examples, at least one processor 170 may receive various data or information from the external device connected thereto through the communication interface 140, and transmit various data or information to the external device.

The communication interface 140 may include at least one of a wireless fidelity (WiFi) module, a Bluetooth module, a wireless communication module, a near field communication (NFC) module, or a ultra wide band (UWB) module. Furthermore, the wireless communication module may perform the communication based on various communication protocols such as Institute of Electrical and Electronics Engineers (IEEE), Zigbee, $3^{rd}$ generation (3G), $3^{rd}$ generation partnership project (3GPP), long term evolution (LTE), $5^{th}$ Generation (5G), etc.

According to one or more embodiments of the disclosure, at least one processor 170 may receive the data on the plurality of neural network models, the recipe information, the sensing data, the context information, or any other suitable information known to one of ordinary skill in the art from the external device through the communication interface 140. Furthermore, at least one processor 170 may receive, through the communication interface 140, the user data, the information on the weight value assigned to the neural network model, the information on the probability that the cooking steps are performed after a specific cooking step, etc. Furthermore, based on obtaining information on the user's past cooking action or cooking history, at least one processor 170 may control the communication interface 140 to generate the user data based on the information on the user's past cooking action or cooking history, and transfer the generated user data to the external device. The past cooking action or cooking history may refer to an action performed by the user within a predetermined time interval, or may refer to an action performed by user when the user previously cooked the same menu item that is currently being cooked.

The input interface 150 may include a circuit, and at least one processor 170 may receive the user input for controlling the operation of the electronic device 100 through the input interface 150. For example, the input interface 150 may be implemented as a touch screen included in a display. Furthermore, the input interface 150 may be a component such as a signal receiver receiving the user input from the external device. In one or more examples, the input interface 150 may include a camera or a microphone.

According to one or more embodiments the disclosure, at least one processor 170 may receive the user input for selecting a cooking menu through the input interface 150. Furthermore, at least one processor 170 may receive the user input for directly generating or changing the recipe information from the user through the input interface 150, and generate or change the recipe information based on the received user input. Furthermore, the electronic device 100 according to the disclosure may be implemented as the kitchen appliance including the heater 130, such as the cooktop, the gas stove, or the electric stove. In one or more examples, the at least one processor 170 may receive the user input for controlling the heater 130, according to the disclosure. For example, the at least one processor 170 may control the heater 130 based on the context information, or may also control the heater 130 based on the user input. The user input for controlling the heater 130 may be implemented in the form of a physical button, a touch button, or a control valve.

In one or more examples, in addition to the above-described input interface 150, the electronic device 100 may receive the user input through the camera 111 or the microphone 113. For example, based on receiving the user input through motion recognition or voice recognition, the electronic device 100 may receive user motion captured through the camera 111 as the user input or user voice obtained through the microphone 113 as the user input.

The output device 160 may include a circuit, and at least one processor 170 may output various functions that the electronic device 100 may perform through the output device 160. Furthermore, the output device 160 may include at least one of a display 161, a speaker 162, or an indicator 163.

Figure 2C:
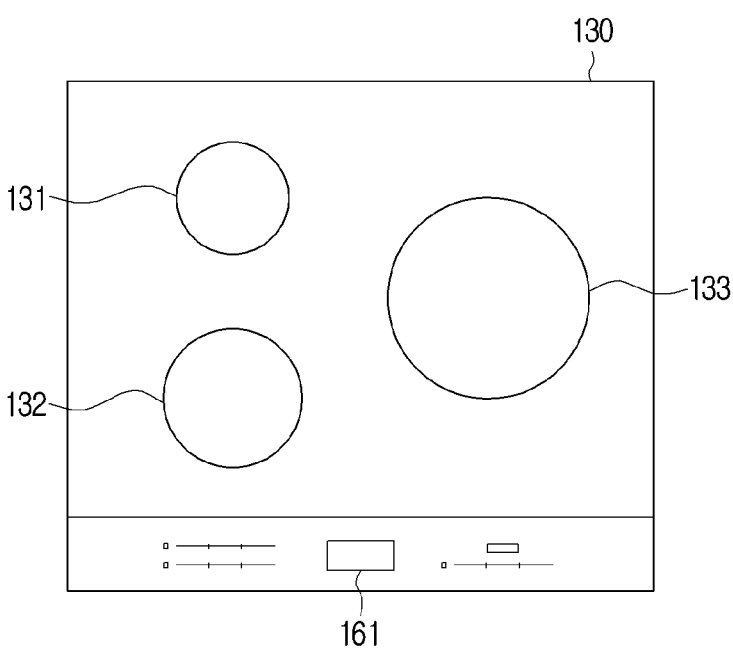
FIG. 2C is a view showing a display, according to one or more embodiments of the disclosure.

In one or more examples, the display 161 may output the image data under the control of at least one processor 170. For example, as shown in FIG. 2C, the display 161 may be positioned at the bottom of the heater 130 including the plurality of burners 131, 132, and 133, and display information on an operation state of the electronic device 100.

The display 161, according to one or more embodiments of the disclosure, may display a user interface stored in the memory 120. The display 161 may be implemented as a liquid crystal display panel (LCD), an organic light emitting diode (OLED), or any other display type known to one of ordinary skill in the art. Furthermore, the display 161 may be implemented as a flexible display, a transparent display or any other known display structure known to one of ordinary skill in the art. However, the display according to the disclosure is not limited to any specific type of display. A speaker 162 may output the sound data under the control of the processor 170, and the indicator 163 may be lit under the control of the at least one processor 170.

According to one or more embodiments of the disclosure, at least one processor 170 may output a guide message representing a control situation of the electronic device 100 or a guide message for prompting the user action through the output device 160. For example, the cooking situation included in the context information may be a situation of "putting garlic, onion, mushroom, bacon, tomato, and sauce in a pan." In this cooking situation, the at least one processor 170 may control the heater 130 to be operated at medium heat for 4 minutes, or also provide a guide message to guide the user to put noodles in the pan after 4 minutes. In another example, the cooking situation included in the context information may be a situation of "putting a steak in the pan." In this cooking situation, at least one processor 170 may output a guide message for prompting the user to flip the steak every 30 seconds.

In one or more examples, the guide message may be output in an auditory form through the speaker 162, which is only an example, and may be transmitted in a visual form through the display 161 or the indicator 163. In one or more examples, based on being connected to the user terminal positioned outside, the electronic device 100 may transmit the guide message to the user terminal. The user terminal may provide the received guide message. In one or more examples, the electronic device 100 may provide the guide message to at least one of the display 161, the speaker 162, or the indicator 163 based on a user setting.

The at least one processor 170 may control one or more operations of the electronic device 100 based on at least one instruction stored in the memory. For example, one or more processors may include at least one of a central processing unit (CPU), a graphic processing unit (GPU), or a neural processing unit (NPU). According to one or more embodiments of the disclosure, a general-purpose processor (e.g., CPU) of at least one processor 170 may perform a general operation, and an artificial intelligence processor (e.g., GPU or NPU) of at least one processor 170 may perform an artificial intelligence operation. In one or more embodiments of the disclosure, the artificial intelligence processor of at least one processor 170 may be used for an operation to obtain the context information on the cooking situation included in the sensing data by inputting the sensing data obtained through at least one sensor 110 to at least one first neural network model. Furthermore, the general-purpose processor of at least one processor 170 may be used for other operations other than the operation to obtain the context information. However, the above cases are only examples, and one processor may control the operation of the electronic device 100.

In one or more examples, at least one processor 170 may obtain the recipe information corresponding to the selected cooking menu based on receiving the user input for selecting a cooking menu. Furthermore, at least one processor 170 may identify a first cooking step and at least one cooking step to be performed after the first cooking step among the plurality of cooking steps included in the recipe information. Furthermore, at least one processor 170 may load at least one first neural network model among the plurality of neural network models based on the recipe information and the resource of the electronic device 100, where the first neural network model corresponds to the first cooking step and at least one cooking step to be performed after the first cooking step. Furthermore, at least one processor 170 may obtain sensing data from the at least one sensor, and input the sensing data in to the first neural network model to obtain the context information on the cooking situation. Furthermore, at least one processor 170 may control the operation of the electronic device based on the recipe information and the context information. Furthermore, based on detecting a neural network model change event based on the context information, the at least one processor 170 may load at least one second neural network model among the plurality of neural network models, where the at least one second neural network model is determined based on the context information and resource information of the electronic device.

In one or more examples, the at least one processor 170 may identify the first cooking step included in the recipe information. Furthermore, at least one processor 170 may obtain the information on the probability that the cooking steps are performed after the first cooking step based on the recipe information. Furthermore, the at least one processor 170 may identify at least one cooking step among the next cooking steps after the first cooking step based on the information on the probability that the cooking steps are performed after the first cooking step.

In one or more examples, the recipe information may include a knowledge graph showing the recipe. In one or more examples, the knowledge graph may include a plurality of nodes representing the plurality of cooking steps for completing the cooking menu based on the recipe and a plurality of edges representing a sequential relationship between the plurality of cooking steps. Furthermore, at least one processor 170 may obtain the information on the probability that the cooking steps are performed after the first cooking step based on a distance between a node representing the first cooking step and nodes representing the next cooking steps after the first cooking step.

In case that the plurality of the first neural network models exist (e.g., the plurality of neural network models include a plurality of the first neural network model), the at least one processor 170 may identify the resource required to execute each of the plurality of first neural network models. The at least one processor 170 may determine the number of neural network models to be simultaneously loaded among the plurality of first neural network models based on the resource of the electronic device and the resource required to execute each of the plurality of first neural network models.

For example, the at least one processor 170 may determine a weight value of each of the plurality of first neural network models based on the probability that the cooking step is performed after the first cooking step. Furthermore, at least one processor 170 may sequentially load the plurality of first neural network models based on the determined weight values. Furthermore, at least one processor 170 may obtain the context information on the cooking situation by inputting the sensing data to the plurality of sequentially loaded first neural network models.

Furthermore, the at least one processor 170 may load at least one first neural network model corresponding to the first cooking step and at least one cooking step to be performed after the first cooking step among the plurality of neural network models based on at least one of a type of at least one sensor 110 and an illuminance value obtained from the illuminance sensor 115.

In one or more examples, the neural network model change event may be an event where the cooking situation in which a second cooking step different from the first cooking step is performed. Based on detecting this event, the at least one processor 170 may identify based on the context information, the second cooking step and at least one cooking step to be performed after the second cooking step among the plurality of cooking steps included in the recipe information. Furthermore, at least one processor 170 may load at least one second neural network model corresponding to the second cooking step and at least one cooking step to be performed after the second cooking step among the plurality of neural network models based on the recipe information and the resource of the electronic device 100.

In one or more examples, the at least one processor 170 may determine whether to change the recipe information based on the context information and the recipe information. The at least one processor 170 may obtain changed recipe information based on determining that the recipe information is changed. The at least one processor 170 may identify the second cooking step and at least one cooking step to be performed after the second cooking step among the plurality of cooking steps included in the changed recipe information based on the context information. Furthermore, the at least one processor 170 may load at least one second neural network model corresponding to the second cooking step and at least one cooking step to be performed after the second cooking step among the plurality of neural network models based on the changed recipe information and the resource of the electronic device 100.

Furthermore, the at least one processor 170 may determine whether a cooking step exists between the first cooking step and the second cooking step. The at least one processor 170 may determine that recipe information is not changed in case that no cooking step exists between the first cooking step and the second cooking step. The at least one processor 170 may determine whether the cooking step between the first cooking step and the second cooking step is a cooking step related to the next cooking step after the second cooking step based on a determination that a cooking step exists between the first cooking step and the second cooking step. The at least one processor 170 may determine that the recipe information is changed based on determining that the cooking step between the first cooking step and the second cooking step is the cooking step related to the next cooking step after the second cooking step.

In one or more examples, the neural network model change event may be an event where a new cookware not included in the recipe information is detected. Based on detecting the new cookware not included in the recipe information based on the context information, the at least one processor 170 may change the recipe information based on the new cookware. Furthermore, based on the changed recipe information and the resource of the electronic device 100, the at least one processor 170 may load at least one second neural network model among the plurality of neural network models corresponding to the second cooking step and at least one cooking step to be performed after the second cooking step.

Figure 2D:
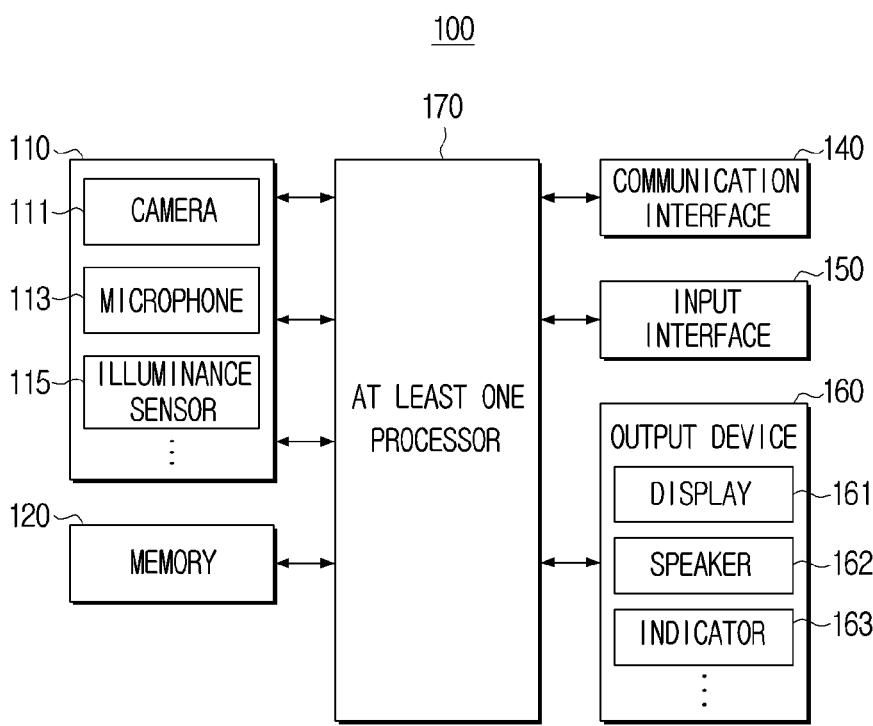
FIG. 2D is a block diagram including a configuration of an electronic device, according to one or more embodiments of the disclosure.

While FIG. 2A shows that the heater 130 is positioned in the electronic device 100, this configuration is only an example, and the electronic device 100 may be implemented as the hood or the user terminal, where the electronic device 100 may not include the heater 130, as shown in FIG. 2D. In one or more examples, the electronic device 100 may communicate with another electronic device including the heater 130 and control another electronic device including the heater 130.

Figure 3:
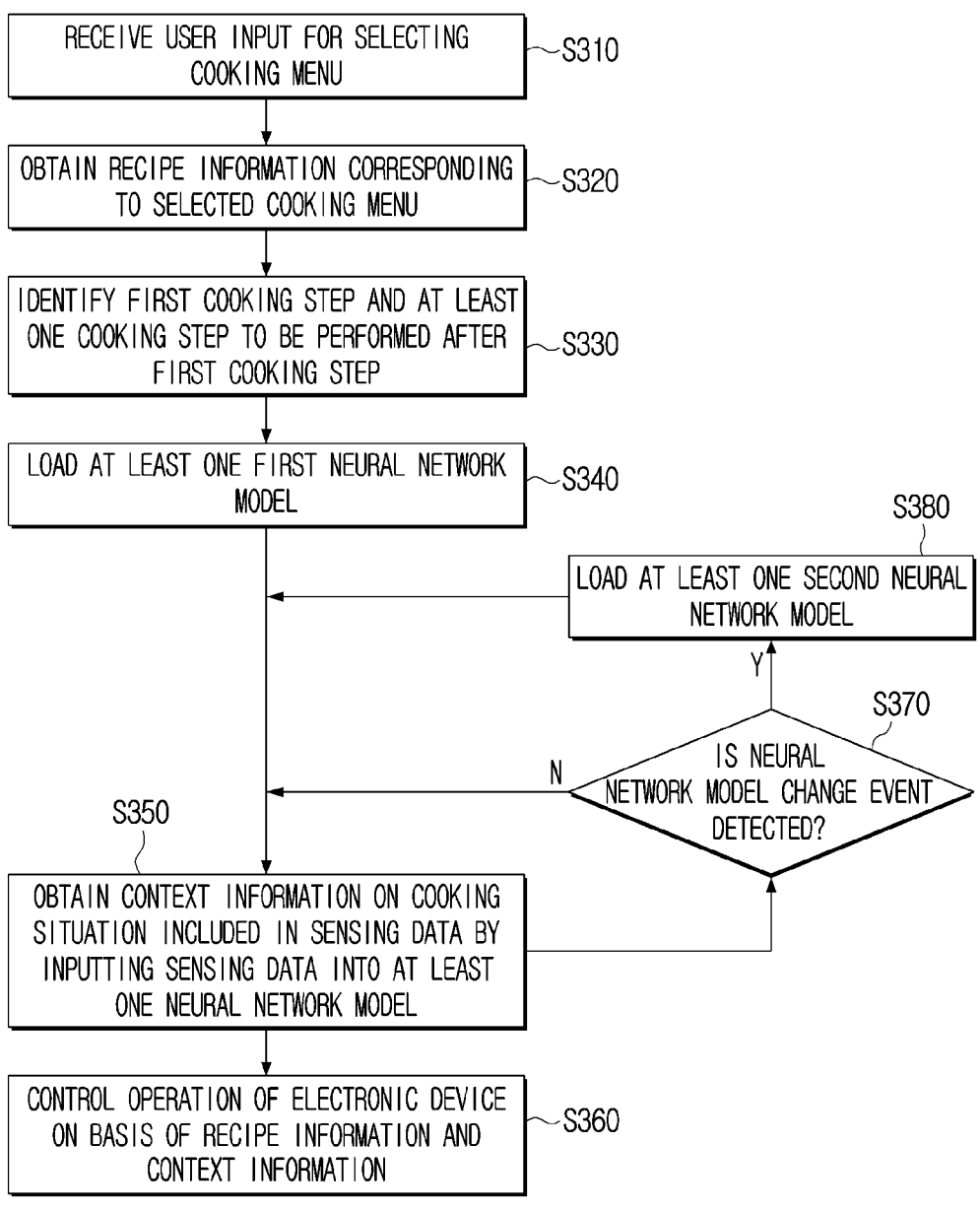
FIG. 3 is a flowchart illustrating a controlling method of an electronic device including loading a neural network model based on recipe information and context information, according to one or more embodiments of the disclosure.

FIG. 3 is a flowchart illustrating a controlling method of an electronic device including loading a neural network model based on recipe information and context information according to one or more embodiments of the disclosure.

An electronic device 100 may receive a user input for selecting a cooking menu (S310). For example, the electronic device 100 may receive the user input for selecting a cooking menu through an input interface 150 (e.g., a touch screen). The cooking menu may specify a cooking item to be cooked.

In one or more examples, the electronic device 100 may receive the user input for selecting a cooking menu through an external device (e.g., user terminal) connected to the electronic device 100. For example, when an application for controlling the electronic device 100 is executed in the external device, the external device may receive the user input through a screen on which the application is executed. The external device may transmit the user input for selecting a cooking menu to the electronic device 100.

In one or more embodiments, the electronic device 100 may receive the user input for selecting a cooking menu by capturing an identification code (e.g., barcode or QR code) included in a food ingredient through a camera 113. For example, the electronic device 100 may obtain information on a cooking menu selected by a user through the user input of capturing the QR code positioned on a packaging of the food ingredient. In one or more examples, the electronic device 100 may obtain the information on the cooking menu corresponding to the identification code captured by the user terminal. In detail, based on capturing the identification code, the user terminal may obtain the information on the cooking menu corresponding to the identification code. The user terminal may transmit the obtained information on the cooking menu to the electronic device 100, and the electronic device 100 may obtain the information on the cooking menu from the user terminal.

The electronic device 100 may obtain the recipe information corresponding to the selected cooking menu (S320). In one or more examples, the electronic device 100 may obtain the recipe information corresponding to the selected cooking menu by searching for a recipe corresponding to the selected cooking menu in a pre-built recipe database. The recipe database may be stored in the electronic device 100 as well as in the external device.

The "recipe information," may include information on each step of the recipe to complete the cooking menu. For example, the recipe information may include information on a plurality of cooking steps.

The recipe information may be implemented in the form of a knowledge graph showing the recipe. In one or more examples, "knowledge graph" refers to a data structure including a plurality of nodes and a plurality of edges connecting the plurality of nodes to each other. The plurality of "nodes" may represent one of the plurality of cooking steps to complete the cooking menu based on the recipe, and the plurality of "edges" may represent a sequential relationship between the cooking steps corresponding to the plurality of nodes.

Furthermore, a "distance between the nodes" may be determined based on the number of other nodes included in a minimum path connecting two nodes to each other. For example, a distance between a first node and a second node may be zero in case that the first node and the second node are directly connected to each other, and the distance between the first node and the second node may be 1 in case that the first node is connected to the second node through a third node.

Furthermore, the plurality of nodes may each include information on an object related to each cooking step and information on an action on the object. In one or more examples, the information on the object may include information on a cooktop, a cookware, a food ingredient or any other suitable cooking information known to one of ordinary skill in the art, and the information on the action on the object may include information on the user's cooking action, time to perform the cooking action, or any other suitable cooking action information known to one of ordinary skill in the art. The description describes the recipe information in detail below with reference to FIGS. 4A and 4B.

The electronic device 100 may identify a first cooking step and at least one cooking step to be performed after the first cooking step (S330). In one or more examples, "first cooking step" may represent the first cooking step among the plurality of cooking steps. However, the "first cooking step" may represent any of the plurality of cooking steps. At least one cooking step to be performed after the first cooking step may not represent only the cooking step that may be performed immediately after the first cooking step, and may be identified from the plurality of cooking steps that may be performed after the first cooking step.

For example, the electronic device 100 may identify at least one cooking step among the next cooking steps after the first cooking step based on information on a probability that cooking steps are performed after the first cooking step. In one or more examples, the electronic device 100 may identify, as at least one cooking step, the cooking step in which the probability that a cooking step is performed after the first cooking step is greater than or equal to a threshold value. The description describes this configuration in detail below with reference to FIG. 5.

The electronic device 100 may load at least one first neural network model (S340). In one or more examples, based on the recipe information and a resource of the electronic device 100, the electronic device 100 may load at least one first neural network model among the plurality of neural network models corresponding to the first cooking step, and load at least one cooking step to be performed after the first cooking step.

In one or more examples, the electronic device 100 may identify at least one first neural network model corresponding to the identified first cooking step and at least one cooking step to be performed after the first cooking step. The electronic device 100 may determine the number of neural network models to be simultaneously loaded based on the resource of the electronic device 100 and resources of the plurality of first neural network models based on a determination that the plurality of first neural network models exist. Furthermore, the electronic device 100 may determine whether the sum of the resources of the plurality of first neural network models is less than the resource of the electronic device. When the sum of the resources of the plurality of first neural network models is less than the resource of the electronic device, the electronic device 100 may simultaneously load the plurality of first neural network models. When the sum of the resources of the plurality of first neural network models is greater than or equal to the resource of the electronic device, the electronic device 100 may sequentially load the plurality of first neural network models based on respective weight value of each first neural network model of the plurality of first neural network models. In one or more examples, the electronic device 100 may determine the weight values of the plurality of first neural network models based on the information on the probability that at least one cooking step is performed after the first cooking step.

Furthermore, the electronic device 100 may load at least one first neural network model corresponding to the first cooking step and at least one cooking step to be performed after the first cooking step among the plurality of neural network models based on at least one of a type of at least one sensor 110 and an illuminance value obtained from an illuminance sensor 115. The description describes a method of loading at least one first neural network model by the electronic device 100 in more detail with reference to FIGS. 6 to 7B.

The electronic device 100 may input sensing data into at least one neural network model to obtain the context information on a cooking situation indicated in the sensing data (S350). The "context information" may include information on the cooking situation included in the sensing data. In one or more examples, when the sensing data includes an image, the context information may include information on user action included in the image, the information on the object included in the image, etc. For example, the information on the user action included in the image may represent the user action such as whether the user slices the food ingredient, whether the user puts the food ingredient into the cookware, or whether the user stir-fries the food ingredient. In one or more examples, the user action included in the image may include the user action (in a verb form) and an object (in a noun form) that is a target of the user action, and an action recognition model may thus output the user action included in the image (in a verb-noun pair form). For example, the action recognition model may output the user action included in the image, such as "action of {putting} {pasta} in {pot}" or "action of {putting} {pasta} in {pan} and then "action of {stir-frying}" the same. In one or more examples, the action recognition model may perform learning to classify the user actions included in the image based on a tagged image in the verb-noun pair form. For examples, the action recognition model may perform learning to classify the user actions included in the image based on learning data, which is information on an action in which input data is image data and output data has the verb-noun pair form.

Furthermore, the information on the object included in the image may include the information on the food ingredient (e.g., garlic, onion, mushroom, or noodles) included in the image, information on a change in a state of the food ingredient included in the image, or the information on the cookware (e.g., pot, coating pan, stainless steel pan, cast pan, or ladle) included in the image, etc. For example, an object recognition model may output information on a type of the recognized object in the noun form. In one or more examples, the object recognition model may output the information on the object including the information on the type of the recognized object in the noun form and the change in a state of the object in the verb form. For example, the object recognition model may output the information on the object, such as "{onion} becomes {transparent}" or "{water} {boils}."

Furthermore, when the sensing data includes a sound signal, the context information may include information on a type of sound included in the sound signal. For example, the information on the type of sound may be information on a sound representing a cooking progress state (e.g., sound of boiling water or sound of a pressure cooker) or a sound representing the user's cooking action (e.g., sound of flipping a steak in the pan or chopping vegetables).

Furthermore, the context information may be obtained as final context information through a combination of the context information output by inputting the plurality of sensing data to each neural network model. For example, the electronic device 100 may obtain "water" as the information on the object through the object recognition model, and "boiling sound" as the information on the cooking progress state through a sound recognition model. In one or more examples, when the electronic device 100 may obtain "state where water boils," as the final context information, through a combination of first context information output through the object recognition model and second context information output through the sound recognition model.

Furthermore, the context information may include information on a surrounding environment (e.g., ambient brightness) of the electronic device 100. In one or more examples, the electronic device 100 may obtain the information on the surrounding environment of the electronic device 100 by inputting the obtained image to the neural network model.

Furthermore, the context information may include information on a heater. In one or more examples, the electronic device 100 may obtain the information on the heater on which the cookware is positioned by inputting an image capturing the heater 130 to the neural network model. For example, when the heater 130 including three burners exists, as shown in FIG. 2B, the electronic device 100 may input the image capturing the heater 130 to the neural network model to identify that a burner on which the cookware is positioned is a second burner 132. In one or more examples, the electronic device 100 may analyze pixels of the image capturing the heater 130 to identify that the second burner 132 is the burner on which the cookware is positioned. Furthermore, the electronic device 100 may control the operation temperature and operation time of the second burner 132 on which the cookware is positioned among the heaters 130.

The electronic device 100 may not detect the context information through the at least one neural network model loaded for a threshold time while monitoring the context information through at least one loaded neural network model. For example, the electronic device 100 may identify a next cooking step after the cooking steps corresponding to at least one currently loaded neural network model, and load a neural network model corresponding to the next cooking step. In one or more examples, the cooking steps corresponding to at least one neural network model currently loaded may be the first cooking step and a second cooking step. In one or more examples, based on detecting no context information during the threshold time, the electronic device 100 may load a neural network model corresponding to a third cooking step and a fourth cooking step. In one or more examples, the threshold time may be predetermined, which is only an example, and may be set based on cooking time for the corresponding cooking step.

The electronic device 100 may control an operation of the electronic device 100 based on the recipe information and the context information (S360). In one or more examples, the electronic device 100 may control the heater 130 by identifying to which cooking step of the recipe a current cooking situation belongs, or identifying information on a state of a current food ingredient based on the recipe information and the context information. This configuration is described in detail below with reference to FIG. 15.

The electronic device 100 may then determine whether a neural network model change event is detected (S370). In one or more examples, while obtaining the context information, the electronic device 100 may determine whether the neural network model change event is detected based on the obtained context information. For example, the neural network model change event may be at least one of an event where a cooking situation in which a second cooking step different from a first cooking step is performed is detected, or an event where a new cookware not included in the recipe information is detected. The neural network model change event is described in more detail with reference to FIGS. 8 through 14.

Furthermore, based on the neural network model change event being detected (S370—Y), the electronic device 100 may load at least one second neural network model (S380), which is described in more detail later with reference to the drawings.

Figure 4A:
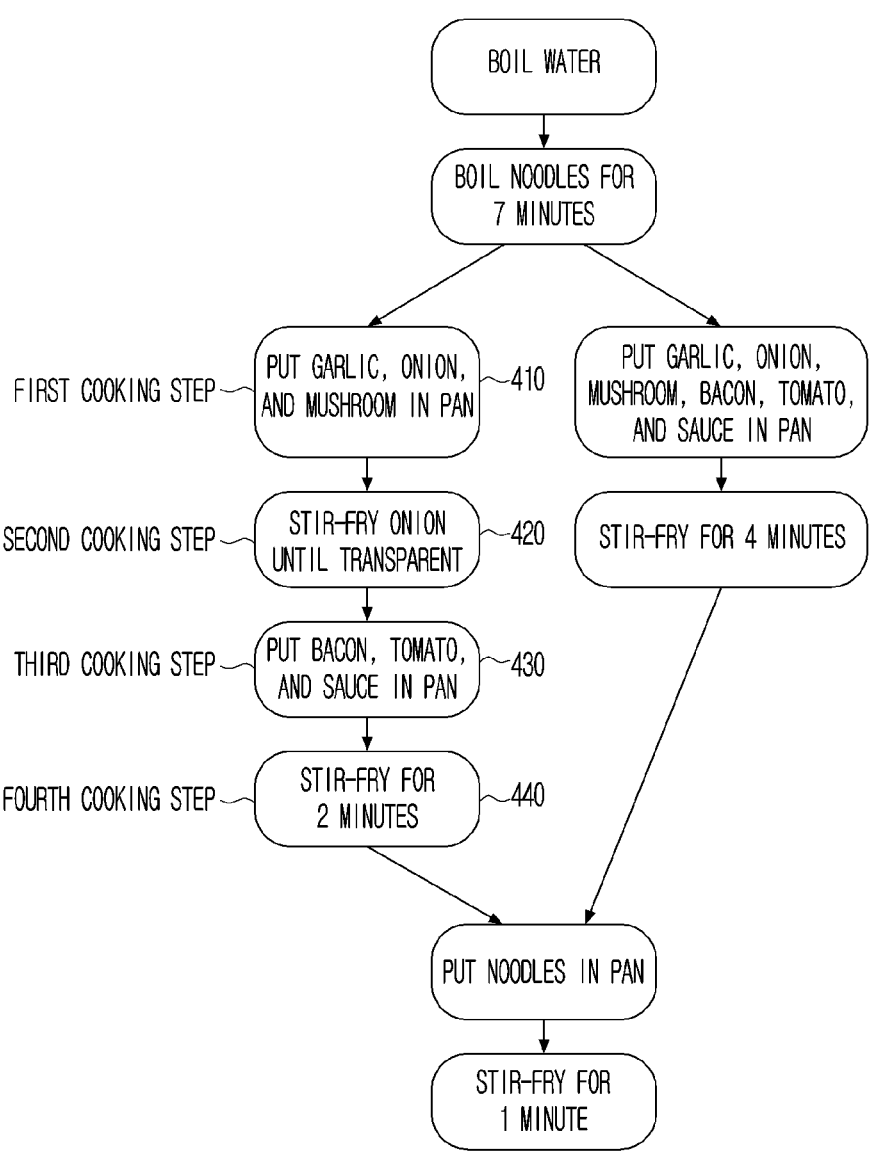
FIG. 4A is a view illustrating recipe information in the form of a knowledge graph, according to one or more embodiments of the disclosure.

FIG. 4A is a view illustrating the recipe information in the form of the knowledge graph according to one or more embodiments of the disclosure. For example, FIG. 4A illustrates an example of recipe information where "tomato spaghetti" is the cooking menu selected by the user input. The recipe information may include an object related to each cooking step and information on an action on the object such as a node representing a step "boil water" or a node representing a step "boil noodles for 7 minutes" connected thereto. A larger number of nodes and edges may be included in the recipe information in addition to the nodes and edges shown in FIG. 4A.

FIG. 4A shows that each node includes information in the form of natural language, such as "boil water", "boil noodles for 7 minutes," or "put garlic, onion, and mushroom in the pan." These nodes are merely examples, where the nodes may separately store information on {object} (e.g., separately store information on cookware and food ingredients) and information on {action}. For example, the node corresponding to "boil water" may store this step in the form of {water} and {boil}, the node corresponding to "boil noodles for 7 minutes" may store this step in the form of {noodles} and {boil for 7 minutes}, and the node corresponding to "put garlic, onion, and mushroom in the pan," may store this step in the form of {pan}, {garlic, onion, mushroom} and {put}.

According to one or more embodiments of the disclosure, the recipe information may include information on the neural network model required for each of the plurality of cooking steps. In one or more examples, the information on the neural network model may include various information such as a type of the neural network model, input/output data of the neural network model, or a resource required for the neural network model. FIG. 4B is a view illustrating the information on the neural network model included in the recipe information according to one or more embodiments of the disclosure.

As shown in FIG. 4B, based on a first cooking step 410 (e.g., step of putting garlic, onion, and mushroom in the pan), the neural network model necessary to identify performance of the first cooking step may include a first object recognition model, a second object recognition model, and a first action recognition model. Based on a second cooking step 420 (e.g., step of stir-frying onion until transparent), the neural network model necessary to identify performance of the second cooking step may include a third object recognition model, a second action recognition model, and a first sound recognition model.

In one or more examples, metadata of each neural network model may include information on input/output data of the neural network model. For example, the first object recognition model may include {image} as the input data and {whether the object is a pan} as the output data.

Furthermore, in FIG. 4A, the metadata of each neural network model may further include information on the resource required for loading the neural network model, a version of the neural network model, and the like.

Furthermore, the recipe information may be updated based on the user data on the user's past cooking action. In one or more examples, the electronic device 100 may obtain the user data on the user's past cooking action, and store the same in the memory of the electronic device 100 or the memory of the user terminal in which an application for controlling the electronic device 100 is installed.

In one or more examples, the electronic device 100 may determine whether the cooking action is performed according to a plurality of cooking steps included in the selected cooking menu while performing the selected cooking menu. For example, the electronic device 100 may determine whether some of the plurality of cooking steps are omitted or whether the food ingredients, cookware, cooking method, or any other cooking processes of the plurality of cooking steps are changed. The electronic device 100 may determine that cooking is not performed according to the plurality of cooking steps, for example, some of the plurality of cooking steps are omitted, the food ingredient, cookware, cooking method, or the like of some of the plurality of cooking steps are changed, or the like. In one or more examples, the electronic device 100 may obtain information on a changed cooking action as the user data.

Furthermore, although food ingredients 1, 2, and 3 are required based on the information on the food ingredients for a selected cooking menu A, food ingredients 1, 2, and 4 may be food ingredients currently detected through the camera 111, or food ingredients stored in the refrigerator. In one or more examples, the electronic device 100 may determine whether the food ingredient 4 may replace the food ingredient 3. For example, the electronic device 100 may search for the recipe information of the cooking menu A including the food ingredient 4 through a search server, and provide the retrieved recipe information to the electronic device 100 or the user terminal that controls the electronic device 100. However, based on determining that the food ingredient 3 cannot be replaced with the food ingredient 4, the electronic device 100 may change a cooking step including the food ingredient 3 among the plurality of cooking steps. Furthermore, the user may perform the selected cooking menu A by omitting the cooking step including the food ingredient 3. For example, the electronic device 100 may store user identification information (e.g., ID information) and information on the omitted cooking step. Furthermore, the number of times in which the cooking step including the food ingredient 3 is omitted while the selected cooking menu A is performed may be greater or equal to a threshold number. In one or more examples, the electronic device 100 may store, as the user data, the recipe information in which the cooking step including the food ingredient 3 is omitted from the recipe information of the cooking menu A.

The electronic device 100 may identify at least one cooking step among the plurality of cooking steps based on the user data on the user's past cooking action. In one or more examples, the electronic device 100 may change some of the plurality of cooking steps included in the recipe information by adding or deleting some nodes or changing contents of some nodes in the recipe information based on the user data.

For example, electronic device 100 may obtain information that garlic, onion, mushroom, bacon, tomato, and sauce are not put in the pan simultaneously while the user cooks "tomato spaghetti" and store the same as the user data. Therefore, as a result, the electronic device 100 may update the recipe information by deleting a node representing a step "put garlic, onion, mushroom, bacon, tomato, and sauce in the pan" and deleting a node representing a next step "stir-fry the food ingredients for 4 minutes" after the step "put garlic, onion, mushroom, bacon, tomato, and sauce in the pan."

Furthermore, the electronic device 100 may obtain information that while the user cooks "tomato spaghetti," the user puts the noodles in the pan, then stir-fries the noodles for the last 2 minutes, and adds parmesan cheese powder thereto, and store this information as the user data. In one or more examples, in the recipe information before the update, a next node after the node representing the step "put noodles in the pan" may represent a step "stir-fry for 1 minute." Therefore, as a result, the electronic device 100 may update the recipe information so that the node corresponding to the step "stir-fry for 1 minute" is updated to represent a step "stir-fry for 2 minutes," and a node representing a step "add parmesan cheese powder" is added after the node representing the step "stir-fry for 2 minutes."

Figure 5:
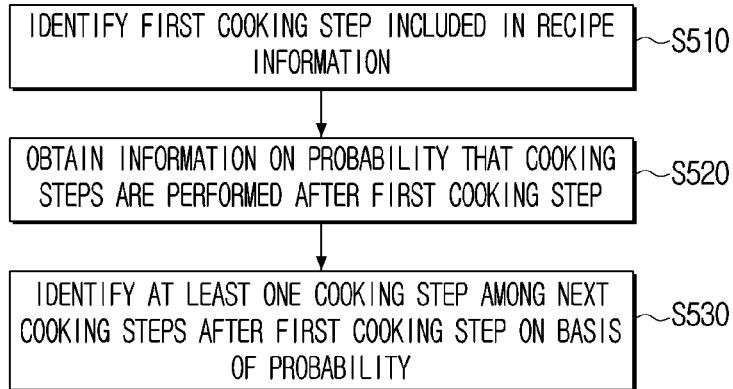
FIG. 5 is a flowchart illustrating a method for identifying cooking steps, according to one or more embodiments of the disclosure.

FIG. 5 is a flowchart illustrating a method for identifying the first cooking step and at least one cooking step to be performed after the first cooking step, according to one or more embodiments of the disclosure.

First, the electronic device 100 may identify the first cooking step included in the recipe information (S510). In one or more examples, the electronic device 100 may identify the first cooking step among the plurality of cooking steps included in the recipe information as the first cooking step. In one or more examples, the electronic device 100 may identify the first cooking step among the plurality of cooking steps based on the pre-obtained context information. The description describes a method of identifying the cooking step based on the context information in detail below.

The electronic device 100 may obtain the information on the probability that the cooking steps are performed after the first cooking step (S520). In one or more examples, the electronic device 100 may obtain the information on the probability that the cooking steps are performed after the first cooking step based on a distance between a node representing the first cooking step and nodes representing the next cooking steps after the first cooking step.

In one or more examples, as exemplified in FIG. 4A, in the recipe information, the second node representing the second cooking step may be connected to the first node representing the first cooking step. In one or more examples, the electronic device 100 may determine that a probability that the second cooking step is performed after the first cooking step is 50%. Furthermore, the third node representing the third cooking step may not be connected to the first node, and connected to the second node. Therefore, the electronic device 100 may determine that the probability that the third cooking step is performed after the first cooking step is 25%. For example, the electronic device 100 may obtain the information on the probability that the cooking steps are performed after the first cooking step based on the distance between the nodes included in the recipe information.

In one or more examples, in the recipe information, the first node representing the first cooking step may be connected to the second node representing the second cooking step, and the third node representing the third cooking step may also be connected to the first node. Therefore, as a result, the electronic device 100 may obtain the information on the probability that the cooking steps are performed after the first cooking step by determining that the probability that the second cooking step is performed after the first cooking step and the probability that the third cooking step is performed after the first cooking step are the same as each other. For example, the electronic device 100 may determine that the probability that the second cooking step is performed after the first cooking step is 50%, and that the probability that the third cooking step is performed after the first cooking step is 50%.

The electronic device 100 may identify at least one cooking step among next cooking steps after the first cooking step based on the obtained probability (S530). In one or more examples, the electronic device 100 may identify, as at least one cooking step, a cooking step whose probability of being performed after the first cooking step is greater than or equal to a predetermined threshold value (e.g., 20%) among the cooking steps that may be performed after the first cooking step.

For example, the electronic device 100 may determine that the probability that the second cooking step is performed after the first cooking step is 50%, the probability that the third cooking step is performed after the first cooking step is 25%, and the probability that the fourth cooking step is performed after the first cooking step 12.5%. Therefore, the electronic device 100 may identify, as at least one cooking step, the second cooking step and the third cooking step whose probability of being performed after the first cooking step is greater than or equal to the predetermined threshold value (e.g., 20%).

In one or more examples, the electronic device 100 may identify at least one cooking step by identifying a predetermined number of cooking steps in order of higher probability of being performed after the first cooking step among the cooking steps that may be performed after the first cooking step. For example, the electronic device 100 may determine that the probability that the second cooking step is performed after the first cooking step is 50%, the probability that the third cooking step is performed after the first cooking step is 25%, and the probability that the fourth cooking step is performed after the first cooking step is 12.5%. Therefore, the electronic device 100 may identify, as at least one cooking step, the second cooking step and the third cooking step, corresponding to the predetermined numbers (e.g., two) in the order of highest probability to lowest probability.

Figure 6:
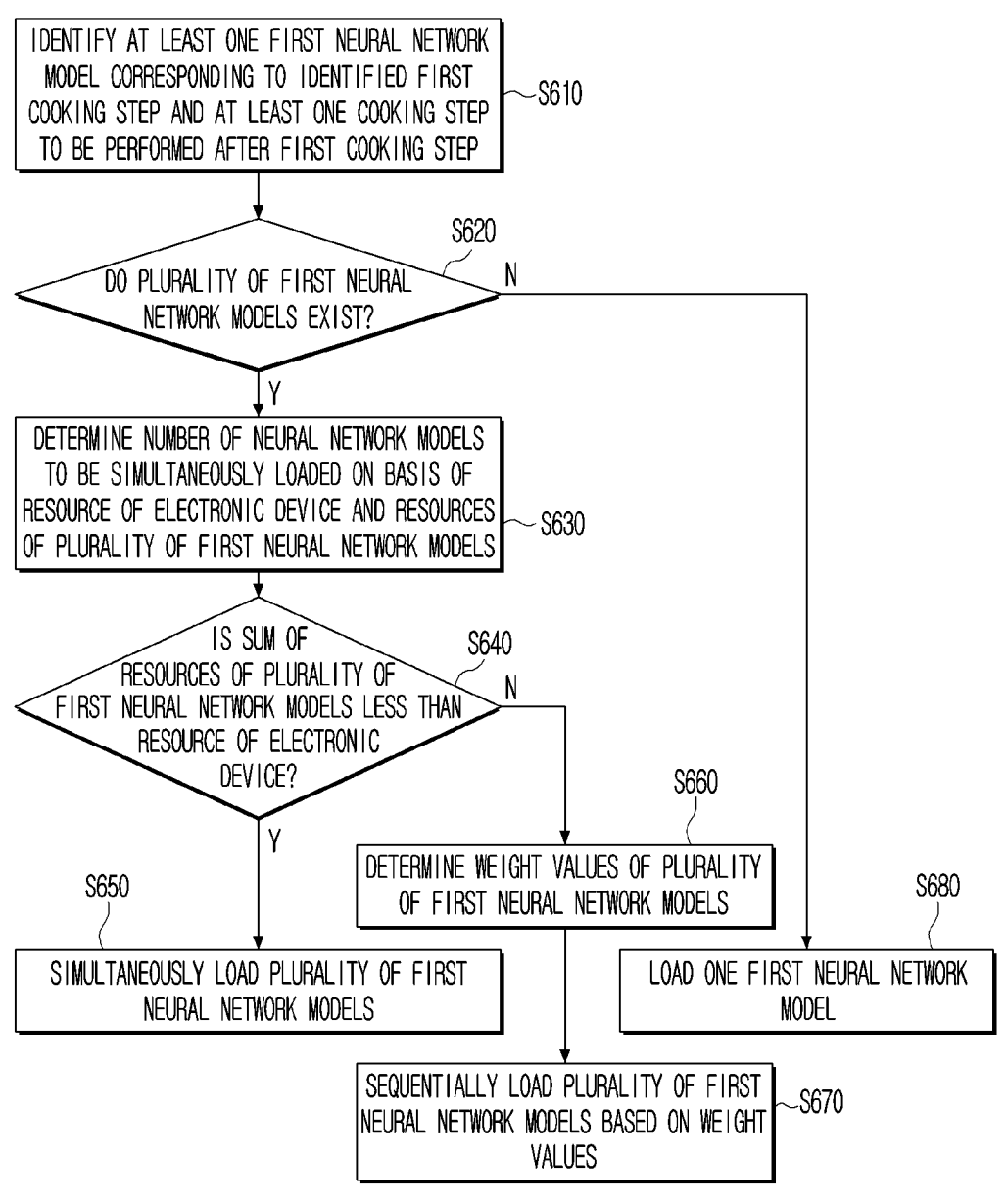
FIG. 6 is a flowchart illustrating a method of loading a first neural network model, according to one or more embodiments of the disclosure.

FIG. 6 is a flowchart illustrating a method of loading a first neural network model, according to one or more embodiments of the disclosure.

In one or more examples, the electronic device 100 may identify at least one first neural network model corresponding to the identified first cooking step and at least one cooking step to be performed after the first cooking step (S610).

In one or more examples, the electronic device 100 may identify at least one first neural network model corresponding to the first cooking step and at least one cooking step to be performed after the first cooking step based on information on the neural network model required for each cooking step included in the recipe information. For example, the recipe information may include the information on the neural network model such as "a neural network model A corresponding to the first cooking step, neural network models B and C corresponding to the second cooking step, and neural network models C, D, and F corresponding to the third cooking step." In one or more examples, based on identifying the first cooking step to the third cooking step as the first cooking step and at least one cooking step to be performed after the first cooking step, the electronic device 100 may identify the neural network models A, B, C, D, and F as at least one first neural network model.

In one or more examples, the recipe information may not include the information on the neural network model required for each cooking step. When this information is not included in the recipe information, the electronic device 100 may identify at least one first neural network model corresponding to the first cooking step and at least one cooking step to be performed after the first cooking step based on the recipe information and metadata of the neural network model. In one or more examples, the electronic device 100 may identify at least one first neural network model by comparing the food ingredient for each cooking step, the cookware, the user action included in the image, included in the recipe information, with information on the input/output data included in the metadata of the neural network model. For example, in the recipe information, the cookware of the first cooking step included may be the "pan," the food ingredient may be "garlic, onion, and mushroom," and the user action may be "put." Accordingly, the electronic device 100 may identify at least one neural network model which may identify the cookware, food ingredient, and user action of the first cooking step among the plurality of neural network models stored in the electronic device 100 based on the input/output data of the plurality of neural network models. For example, the electronic device 100 may identify, as the neural network model corresponding to the first cooking step, a first object recognition model that may identify the "pan," a second object recognition model that may identify "onion, mushroom, and garlic," and a first action recognition model that may recognize the action "put." As a result of these identifications, the electronic device 100 may identify at least one first neural network model corresponding to the first cooking step and at least one cooking step to be performed after the first cooking step.

The electronic device 100 may determine whether the plurality of identified first neural network models exist (S620). For example, it is determined that the plurality of first neural network models exist when it is determined that there are a plurality of neural network models to be loaded for the first cooking step and at least one cooking step performed after the first cooking step.

When the plurality of first neural network models exist (S620—Y), the electronic device 100 may determine the number of neural network models to be simultaneously loaded based on the resource of the electronic device 100 and the resources of the plurality of first neural network models (S630). In one or more examples, the resource of the electronic device 100 may be information on a resource currently available to the electronic device 100, including an amount of memory currently available for the electronic device 100, a processing capability (CPU utilization rate, NPU or GPU utilization rate, or the like) of the current electronic device 100, etc. Furthermore, the resource of the first neural network model may be information on a resource required for loading the first neural network model. According to one or more embodiments of the disclosure, the resource of the electronic device 100 may represent a total resource currently available to the electronic device 100. In one or more examples, the resource of the electronic device 100 may represent a resource of a critical ratio (e.g., 80%) among the total resource available in consideration of another task.

In one or more examples, the electronic device 100 may determine whether the sum of the resources of the plurality of first neural network models less than the resource of the electronic device 100 (S640).

When it is determined that the sum of the resources of the plurality of first neural network models is less than the resource of the electronic device 100 (S640—Y), the electronic device 100 may simultaneously load the plurality of first neural network models (S650). An example method of simultaneously loading the plurality of first neural network models in more detail with reference to FIG. 7A.

Figure 7A:
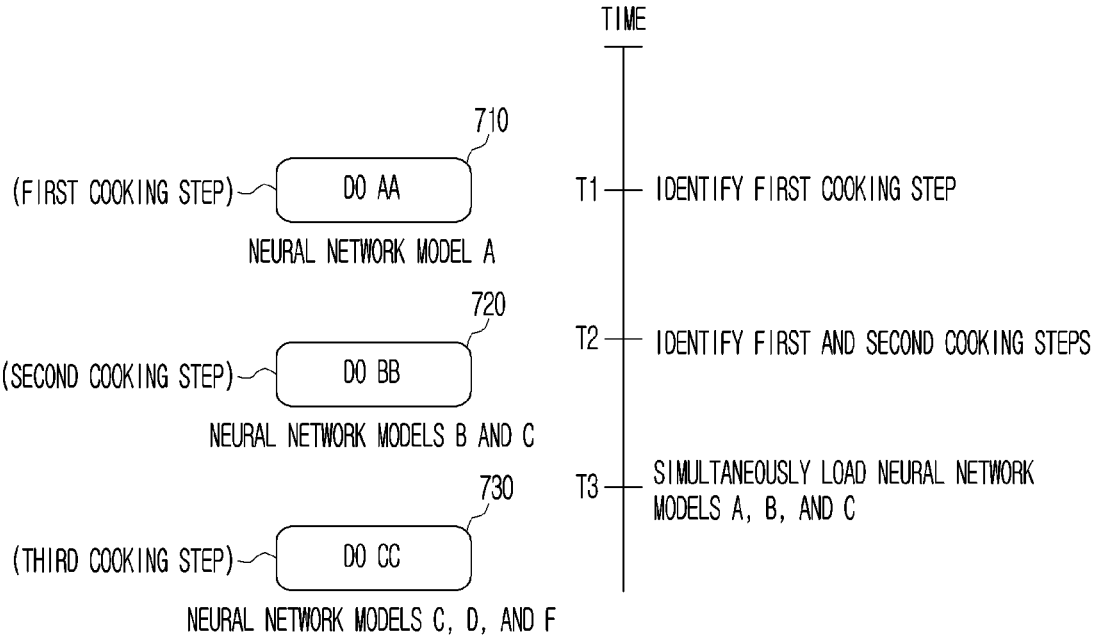
FIG. 7A is a view illustrating an example of simultaneously loading the plurality of neural network models, according to one or more embodiments of the disclosure.

As shown in FIG. 7A, a neural network model corresponding to a first cooking step 710 may be a neural network model A, neural network models corresponding to a second cooking step 720 may be neural network models B and C, and a neural network model corresponding to a third cooking step 730 may be neural network models C, D, and F. In one or more examples, the electronic device 100 may identify the first cooking step (T1), and identify the second cooking step as the first cooking step and at least one next cooking step after the first cooking step (T2). Furthermore, the electronic device 100 may identify the neural network models A, B, and C as the plurality of first neural network models corresponding to the first cooking step and the second cooking step. In one or more examples, when the sum of the resources of the neural network models a, b, and c is less than the resource of the electronic device 100, the electronic device 100 may simultaneously load the neural network models a, b, and c (T3).

Referring back to FIG. 6, when the sum of the resources of the plurality of first neural network models is greater than or equal to the resource of the electronic device 100 (S640—Y), the electronic device 100 may determine the weight values of the plurality of first neural network models (S660). For example, the electronic device 100 may determine the weight values of the plurality of first neural network models based on the information on the probability that at least one cooking step is performed after the first cooking step obtained in a step S420 of FIG. 4.

The electronic device 100 may sequentially load the plurality of first neural network models based on the weight values (S670). An example method of sequentially loading the plurality of first neural network models is described in more detail with reference to FIG. 7B.

Figure 7B:
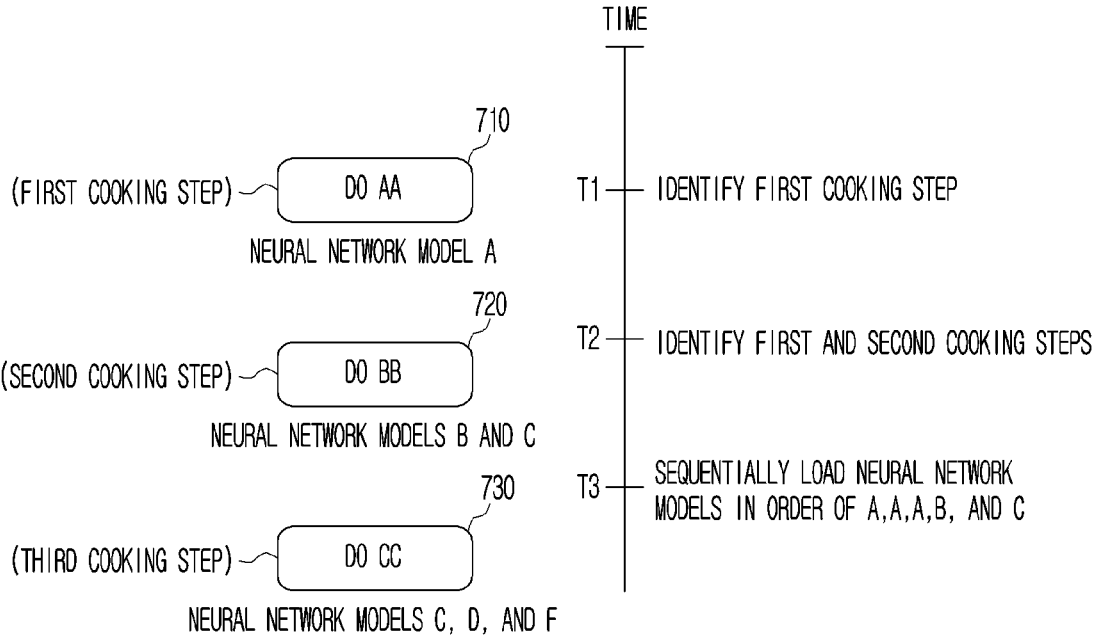
FIG. 7B is a view illustrating an example of sequentially loading the plurality of neural network models, according to one or more embodiments of the disclosure.

As shown in FIG. 7B, the neural network model corresponding to the first cooking step 710 may be the neural network model A, the neural network models corresponding to the second cooking step 720 may be the neural network models B and C, and the neural network model corresponding to the third cooking step 730 may be the neural network models C, D, and F. In one or more examples, the electronic device 100 may identify the first cooking step (T1), and identify the second cooking step as the first cooking step and at least one next cooking step after the first cooking step (T2). Furthermore, the electronic device 100 may identify the neural network models A, B, and C as the plurality of first neural network models corresponding to the first cooking step and the second cooking step. In one or more examples, when the sum of the resources of the neural network models A, B, and C is greater than or equal to the resource of the electronic device 100, the electronic device 100 may determine the weight values of the neural network models A, B, and C based on the information on the probability that the second cooking step is performed after the first cooking step. For example, the electronic device 100 may determine 1 as the weight value of the neural network model A and 0.33 as the weight value of the neural network models B and C, based on the information on the probability that the second cooking step is performed.

After the weight values of the neural network models are determined, the electronic device 100 may sequentially load the neural network models A, B, and C based on the weight value of the neural network models (T3). In particular, the electronic device 100 may load the neural network models in order of A-A-A-B-C, as shown in FIG. 7B. Based on sequentially loading the neural network models, the electronic device 100 may obtain the context information by inputting the sensing data obtained from at least one sensor to each of the sequentially loaded neural network models in the number of times corresponding to the weight value. For example, loading the neural network models in the order of A-A-A-B-C may represent that the neural network models B and C are used one time for every three uses of the neural network model A. For example, based on loading the neural network models in the order of A-A-A-B-C, the electronic device 100 may load the neural network model A, obtain the first context information by inputting first sensing data to the loaded neural network model A, obtain the second context information by inputting second sensing data to the loaded neural network model A, obtain third context information by inputting third sensing data to the loaded neural network model A, load the neural network model B, obtain fourth context information by inputting fourth sensing data to the loaded neural network model B, load the neural network model C, and obtain fifth context information by inputting fifth sensing data to the loaded neural network model C.

In one or more examples, the electronic device 100 may obtain the sensing data from at least one sensor 110 at regular intervals and input the same to the neural network model. In one or more examples, the electronic device 100 may obtain the sensing data from at least one sensor 110 at a specific time point (e.g., first time point, intermediate time point, or last time point) of the cooking step, and input the same to the neural network model when the cooking step has an operation corresponding to a unit time (e.g., stir-frying for 3 minutes).

Furthermore, based on loading the neural network model, the electronic device 100 may obtain the sensing data by requesting the sensing data from the sensor corresponding to the neural network model. For example, the neural network model A may be the object recognition model, the neural network model B may be the sound recognition model, and the neural network model C may be the action recognition model. In one or more examples, based on loading the neural network model A, the electronic device 100 may request the image data from a camera 111 corresponding to the object recognition model. Furthermore, the electronic device 100 may request sound data from a microphone 113 corresponding to the neural network model B while object recognition operation is performed by the neural network model A or before the object recognition operation is performed by the neural network model A.

In the above examples, the electronic device 100 is described as loading the plurality of first neural network models one by one based on sequential loading of the plurality of first neural network models. However, in one or more examples, the electronic device 100 may simultaneously load at least two of the plurality of first neural network models based on the resource of the electronic device 100 and the resources of the plurality of neural network models. For example, the resources of the neural network models B and C corresponding to the second cooking step shown in FIG. 7B may be less than the resource of the electronic device 100. Therefore, the electronic device 100 may load the neural network models in order of A-A-A-(B and C). For example, the electronic device 100 may load the neural network model A three times and simultaneously load the neural network models B and C one time.

Referring back to FIG. 6, based on determining that one first neural network model exists (S620—N), the electronic device 100 may load one first neural network model (S680).

As shown in FIG. 6, the electronic device 100 may load at least one first neural network model based on the resource of the electronic device 100 and the resource of at least one first neural network model. Therefore, even when there is an insufficient resource for loading the neural network model, the electronic device 100 may identify the cooking situation in real time by using the neural network model in an on-device environment, and perform the control corresponding to the identified cooking situation.

Furthermore, based on at least one of the type of at least one sensor 110 and the illuminance value obtained from the illuminance sensor 115, the electronic device 100 may load at least one first neural network model among the plurality of neural network models corresponding to the first cooking step and at least one cooking step to be performed after the first cooking step.

In one or more examples, based on comparing the information on the type of at least one sensor 110 of the electronic device 100 with the metadata (e.g., the input data) of the plurality of neural network models, the electronic device 100 may load at least one first neural network model among the plurality of neural network models corresponding to the first cooking step and at least one cooking step to be performed after the first cooking step. For example, the electronic device 100 may only include the camera 111 without the microphone 113. Based on this configuration, the electronic device 100 may load only the object recognition model or the action recognition model among the plurality of neural network models without loading the sound recognition model based on the metadata (e.g., the input data).

In one or more examples, the electronic device 100 may identify at least one first neural network model based on loading the first neural network model by comparing the information on the type of at least one sensor 110 with the metadata of the plurality of neural network models. In one or more examples, the electronic device 100 may only download and store only some neural network models among the plurality of neural network models based on the type of at least one sensor 110. For example, the electronic device 100 may only include the camera 111 without the microphone 113. Based on this configuration, the electronic device 100 may download and store only the object recognition model or the action recognition model among the plurality of neural network models.

In one or more examples, based on comparing information on performance of at least one sensor 110 included in the electronic device 100 with the metadata (in particular, the input data), the electronic device 100 may load at least one first neural network model among the plurality of neural network models corresponding to the first cooking step and at least one cooking step to be performed after the first cooking step. For example, the camera 111 included in the electronic device 100 may be the camera that captures a high-definition (HD) image. Based on this configuration, the electronic device 100 may load only the object recognition model or action recognition model that may obtain context information by inputting the HD image into the loaded neural network models among the plurality of neural network models without loading the object recognition model or the action recognition model that may obtain the context information by inputting a Full HD image.

In one or more examples, based on a comparison of the illuminance value obtained from the illuminance sensor 115 and the metadata of the plurality of neural network models, the electronic device 100 may load at least one first neural network model among the plurality of neural network models corresponding to the first cooking step and at least one cooking step to be performed after the first cooking step. In one or more examples, in a bright environment where the illuminance value obtained from the illuminance sensor 115 is greater than or equal to the threshold value, the electronic device 100 may load at least one first neural network model having a first performance by referring to the metadata of the plurality of neural network models. In a dark environment where the illuminance value obtained from the illuminance sensor 115 is less than the threshold value, the electronic device 100 may load at least one first neural network model having a second performance better than first performance by referring to the metadata of the plurality of neural network models.

In the above examples, the electronic device 100 is described as identifying at least one neural network model to be loaded based on the illuminance value. In one or more examples, the electronic device 100 may identify and load the neural network model among the plurality of neural network models corresponding to a changed cooking value when the illuminance value is changed while performing cooking.

The electronic device 100 may then determine whether the neural network model change event is detected (e.g., operation S370 in FIG. 3). In one or more examples, while obtaining the context information, the electronic device 100 may determine whether the neural network model change event is detected based on the obtained context information. In one or more examples, the neural network model change event may be an event for changing the neural network model, and may be at least one of an event where a cooking situation in which the second cooking step different from the first cooking step is performed is detected, or an event where a new cookware not included in the recipe information is detected.

Figure 8:
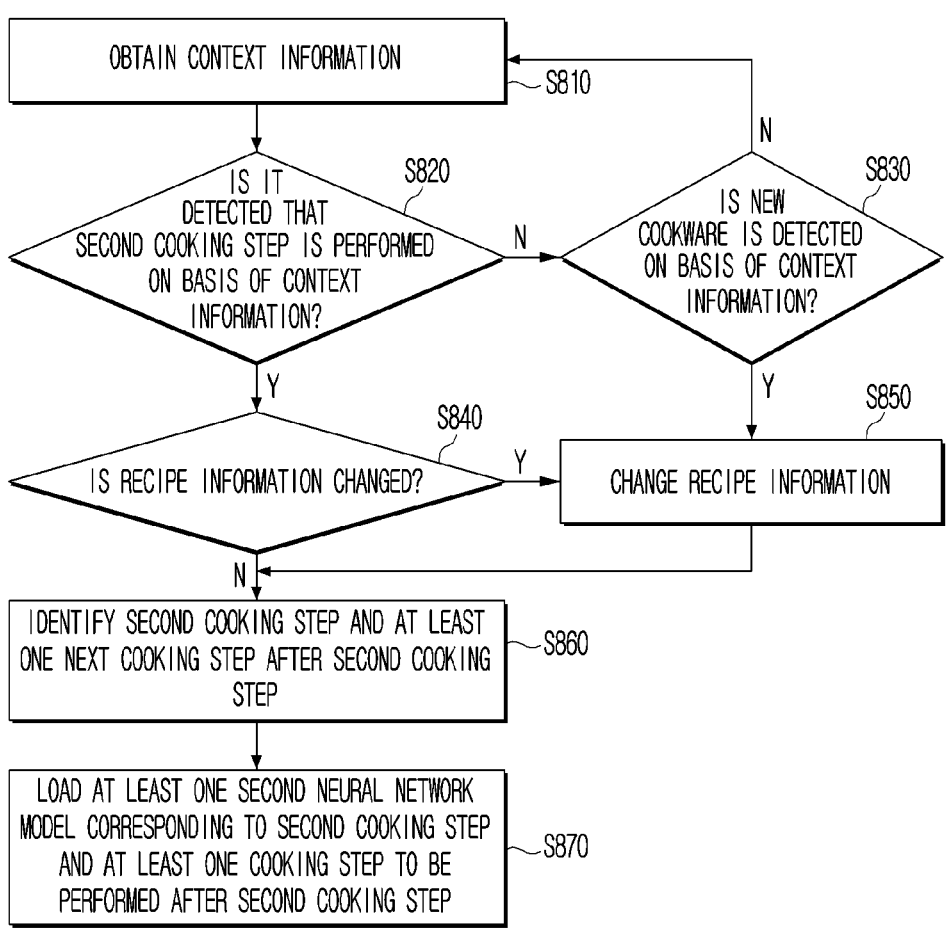
FIG. 8 is a flowchart illustrating a method of loading a second neural network model based on a neural network model change event, according to one or more embodiments of the disclosure.

FIG. 8 is a flowchart illustrating a method of loading the second neural network model based on the neural network model change event according to one or more embodiments of the disclosure.

The electronic device 100 may obtain the context information (S810). For example, the electronic device 100 may obtain the context information output from at least one first neural network model. In one or more examples, the electronic device 100 may obtain and monitor the context information output from at least one first neural network model in real time.

The electronic device 100 may then detect whether the second cooking step is performed based on the context information (S820). In one or more examples, the second cooking step may represent the cooking step that may be performed after the first cooking step. For example, the electronic device 100 may detect whether the second cooking step is performed by identifying the second cooking step that matches the obtained context information among the plurality of cooking steps included in the recipe information. For example, based on obtaining the context information such as an action "stir-fry onion," while monitoring the context information output by the neural network model, the electronic device 100 may detect that the "second cooking step" is performed among the plurality of cooking steps as shown in FIG. 4A.

Based on detecting that the second cooking step is performed (S820—Y), the electronic device 100 may determine whether to change the recipe information (S840). In one or more examples, changing the recipe information may represent deleting or changing at least one node among the plurality of nodes in the graph representing the recipe information, or adding a new node. The description of whether the electronic device 100 changes the recipe information is described with reference to FIG. 9.

Figure 9:
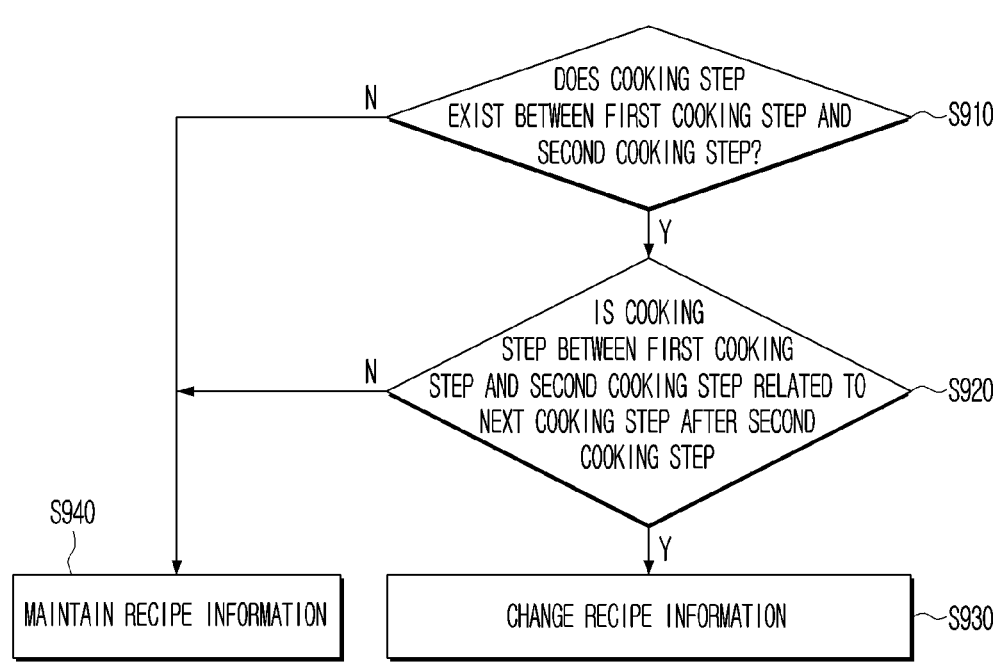
FIG. 9 is a flowchart illustrating an example of changing recipe information, according to one or more embodiments of the disclosure.

Referring to FIG. 9, the electronic device 100 may determine whether a cooking step exists between the first cooking step and the second cooking step (S910). For example, the electronic device 100 may determine whether the next cooking step is immediately performed after the first cooking step.

When it is determined that a cooking step exists between the first cooking step and the second cooking step (S910—Y), the electronic device 100 may determine whether the cooking step between the first cooking step and the second cooking step is related to a next cooking step after the second cooking step (S920). In one or more examples, the electronic device 100 may determine whether the food ingredient and the cookware, included in the cooking step between the first cooking step and the second cooking step, are used in the next cooking step after the second cooking step. For example, "onion" may be the food ingredient included in the cooking step between the first cooking step and the second cooking step, and "stir-fry onion" may be included in the next cooking step after the second cooking step. Therefore, as a result, the electronic device 100 may determine that the cooking step between the first cooking step and the second cooking step is related to the next cooking step after the second cooking step.

Based on determining that the cooking step between the first cooking step and the second cooking step is related to the next cooking step after the second cooking step (S920-Y), the electronic device 100 may change the recipe information (S930). For example, the electronic device 100 may identify the cooking step related to an omitted cooking step (e.g., the cooking step between the first cooking step and the second cooking step) among the cooking steps after the second cooking step, and delete or change a node corresponding to the identified cooking step. For example, "onion" may be the food ingredient included in the cooking step between the first cooking step and the second cooking step, and "stir-fry onion" may be included in the next cooking step after the second cooking step. Therefore, as a result, the electronic device 100 may delete the cooking step "stir-fry onion" related to "onion" among the plurality of cooking steps included in the recipe information.

However, when it is determined that no cooking step exists between the first cooking step and the second cooking step (S910—N), or it is determined that the cooking step between the first cooking step and the second cooking step is not related to the next cooking step after the second cooking step (S920—N), the electronic device 100 may maintain the recipe information (S940).

Referring back to FIG. 8, based on detecting that the second cooking step is not performed (S820—N), the electronic device 100 may determine whether the new cookware is detected based on the context information (S830). In one or more examples, the electronic device 100 may determine whether the new cookware not included in the recipe information is detected based on the context information obtained through the object recognition model.

In one or more examples, the electronic device 100 may determine whether the new cookware is detected based on the context information obtained through the object recognition model for detecting the cookware. For example, "pan" may be the information on the cookware obtained through the object recognition model for recognizing the cookware while "pot" is the cookware included in the recipe information. Therefore, as a result, the electronic device 100 may determine that the new cookware is detected based on the context information.

In one or more examples, the electronic device 100 may not recognize the cookware that is included in the recipe information by using the context information during the threshold time while loading the object recognition model for recognizing the cookware included in the recipe information. Therefore, as a result, the electronic device 100 may load another object recognition model for recognizing the new cookware, and may determine whether the new cookware is detected through another object recognition model. For example, "pot" may be the cookware included in the recipe information. In one or more examples, the electronic device 100 may load the object recognition model for recognizing "pot", and then obtain the context information through the object recognition model for recognizing "pot." In one or more examples, the electronic device 100 may not recognize the "pot" during the threshold time while obtaining the context information. Therefore, as a result, the electronic device 100 may load an object recognition model for recognizing another cookware, and detect the new cookware through the loaded object recognition model. In one or more examples, the object recognition model for recognizing another cookware may be an object recognition model that may recognize the cookware having a super ordinate concept of the "pot" (e.g., the cookware that resembles the food ingredient), or an object recognition model that may recognize a type of cookware (e.g., pan or gourd) different from that of the "pot."

The above example describes the case that the new cookware not included in the recipe information is detected. However, the embodiments of the present disclosure may be applied to a case where a new food ingredient not included in the recipe information is detected.

Referring back to FIG. 8, based on determining that the recipe information is changed (S840—Y) or the new cookware is detected (S830—Y) after detecting whether the second cooking step is performed, the electronic device 100 may change the recipe information (S850). In one or more examples, as described above, the electronic device 100 may identify the cooking step related to an omitted cooking step (e.g., the cooking step between the first cooking step and the second cooking step) among the cooking steps after the second cooking step, and delete or change the node corresponding to the identified cooking step. In one or more examples, based on detecting the new cookware or food ingredient, the electronic device 100 may request the external server to retrieve a recipe including the detected new cookware or food ingredient, and receive the recipe information including the detected new cookware or food ingredient from the external server. For example, the user may select the cooking menu as "cook instant noodles," and "pan" may then be detected as the cookware not included in the recipe information. Therefore, as a result, the electronic device 100 may change the recipe information by receiving the recipe information on "cook instant noodles using a pan" from the external server.

The electronic device 100 may identify the second cooking step and at least one next cooking step after the second cooking step (S860). In one or more examples, the electronic device 100 may identify the second cooking step and at least one next cooking step after the second cooking step based on the recipe information (or the changed recipe information) and the context information. For example, when the cookware is changed to a new cookware, the electronic device 100 may identify the second cooking step including the changed new cookware, and identify at least one cooking step among the cooking steps after the second cooking step. This configuration is described in detail in the step S330 of FIG. 3 and FIG. 5, and the description therefore omits redundant descriptions thereof.

In one or more examples information on the second cooking step detected in the step S820 may be information on completion of the second cooking step. Therefore, as a result, the electronic device 100 may identify only at least one next cooking step after the second cooking step rather than the second cooking step. For example, based on identifying a cooking step "boil water" in the step S820, the electronic device 100 may identify the cooking step "boil water" and the next cooking step because "boiling water" is not completed. However, based on identifying the cooking step "put garlic and onion in the pan" in the step S820, the electronic device 100 may identify the next cooking step after the cooking step "put garlic and onion in the pan" because the cooking step "put garlic and onion in the pan" is completed.

The electronic device 100 may load at least one second neural network model corresponding to the second cooking step and at least one next cooking step after the second cooking step (S870). In one or more examples, the electronic device 100 may load at least one second neural network model corresponding to the second cooking step and at least one cooking step to be performed after the second cooking step among the plurality of neural network models based on the recipe information and the resource of the electronic device 100. This configuration is described in detail in the step S340 of FIG. 3 and FIGS. 6 to 7B, and the description therefore omits redundant descriptions thereof.

The following description describes examples of dynamically loading the neural network model based on the neural network model change event with reference to FIGS. 10, 11, 12, 13 and 14.

FIG. 10 is a view illustrating a first example of the event where the cooking situation in which the second cooking step different from the first cooking step is performed is detected, according to one or more embodiments of the disclosure. First, the recipe information of the cooking menu selected by the user may include first to fifth cooking steps 1010 to 1050. According one or more embodiments of the disclosure, a neural network model for identifying performance of the first cooking step 1010 may be the neural network model A, a neural network model for identifying performance of the second cooking step 1020 may be the neural network models B and C, a neural network model for identifying performance of the third cooking step 1030 may be the neural network models C, D, and F, a neural network model for identifying performance of the fourth cooking step 1040 may be the neural network models F and G, and a neural network model for identifying performance of the fifth cooking step 1050 may be neural network models H and I. In one or more examples, the neural network model for identifying the performance of the first cooking step is described as the model A. However, the models a_1 or a_2 may be further included based on the performance and type of the neural network model. The times T1 to T8 disclosed in FIGS. 10 to 14 may represent the order of operation rather than specific points in time.

First, the electronic device 100 may identify the first cooking step 1010 (T1). For example, the electronic device 100 may identify the first cooking step 1010, which is the first cooking step. Furthermore, the electronic device 100 may identify the second cooking step 1020 after the first cooking step 1010 based on the recipe information. For example, the electronic device 100 may identify the first and second cooking steps 1010 and 1020 (T2).

The electronic device 100 may load at least one neural network model corresponding to the first and second cooking steps 1010 and 1020. For example, the electronic device 100 may sequentially load the neural network models based on each weight value of the neural network models. For example, the electronic device 100 may sequentially load the neural network models in the order of A-A-A-B-C (T3). While the above example describes that the electronic device 100 sequentially load the neural network models in the order of A-A-A-B-C, the electronic device 100 may simultaneously load the neural network models A, B, and C when it is determined that the sum of the resources of the neural network models A, B, and C is less than the resource of the electronic device 100, as described above. However, for convenience of explanation, the description assumes and describes only the sequential loading by excluding the simultaneous loading with reference to FIGS. 10 to 14.

While monitoring the context information, the electronic device 100 may detect a cooking situation "do BB" corresponding to the second cooking step 1020 (T4).

The electronic device 100 may identify the second cooking step 1020 corresponding to the cooking situation "do BB" and the third cooking step 1030, which is the next cooking step after the second cooking step 1020 (T5).

The electronic device 100 may sequentially load the models B, C, D, and F, which are the neural network models corresponding to the second and third cooking steps 1020 and 1030, in an order of B-C-B-C-D-F (T6).

Figure 11:
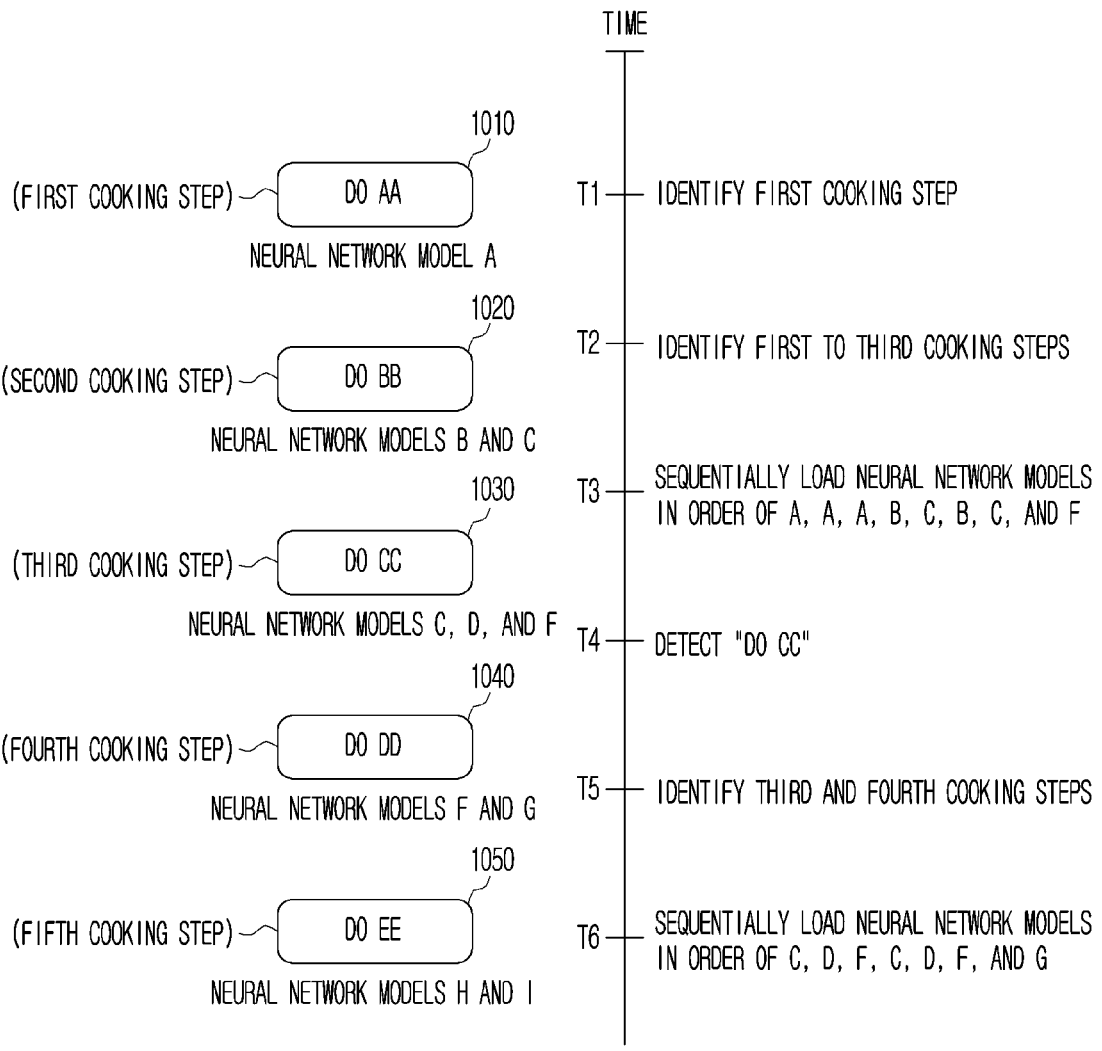

FIG. 11 is a view illustrating a second example of the event where the cooking situation in which the second cooking step different from the first cooking step is performed is detected according to one or more embodiments of the disclosure. As shown in FIG. 10, the recipe information of the cooking menu selected by the user may include the first to fifth cooking steps 1010 to 1050.

First, the electronic device 100 may identify the first cooking step 1010 (T1). For example, the electronic device 100 may identify the first cooking step 1010, which is the first cooking step. Furthermore, the electronic device 100 may identify the second and third cooking steps 1020 and 1030 after the first cooking step 1010 based on the recipe information. For example, the electronic device 100 may identify the first to third cooking steps 1010 to 1030 (T2).

The electronic device 100 may sequentially load the models A, B, C, D, and F, which are the neural network models corresponding to the first to third cooking steps 1010 to 1030, in an order of A-A-A-B-C-B-C-D-F (T3).

The electronic device 100 may detect a cooking situation "do CC" corresponding to the third cooking step 1030 based on the context information obtained while sequentially loading the neural network models A, B, C, D, and F corresponding to the first to third cooking steps 1010 to 1030 (T4). In one or more examples, the electronic device 100 skips the second cooking step 1020 and performs the third cooking step 1030, and may thus, determine whether to change the recipe information. However, based on determining that the second cooking step 1020 is not related to the next cooking step, the electronic device 100 may maintain the recipe information with no change.

The electronic device 100 may identify the third cooking step 1030 corresponding to the cooking situation "do CC" and the fourth cooking step 1040 which is the next cooking step after the third cooking step 1030 (T5).

The electronic device 100 may sequentially load the models C, D, F, and G, which are the neural network models corresponding to the third and fourth cooking steps 1030 and 1040, in an order of C-D-F-C-D-F-G (T6).

FIG. 12 is a view illustrating a third example of the event where the cooking situation in which the second cooking step different from the first cooking step is performed is detected according to one or more embodiments of the disclosure. As shown in FIGS. 10 and 11, the recipe information of the cooking menu selected by the user may include the first to fifth cooking steps 1010 to 1050.

First, the electronic device 100 may identify the first cooking step 1010 (T1). For example, the electronic device 100 may identify the first cooking step 1010, which is the first cooking step. Furthermore, the electronic device 100 may identify the second to fourth cooking steps 1020 to 1040 after the first cooking step 1010 based on the recipe information. For example, the electronic device 100 may identify the first to fourth cooking steps 1010 to 1040 (T2).

The electronic device 100 may sequentially load the models A, B, C, D, F, and G, which are the neural network models corresponding to the first to fourth cooking steps 1010 to 1040, in an order of A-A-A-B-C-B-C-D-F-G (T3).

While monitoring the context information, the electronic device 100 may detect a cooking situation "do DD" corresponding to the fourth cooking step 1040 (T4). In one or more examples, the electronic device 100 skips the second and third cooking step 1020 and 1030 and performs the fourth cooking step 1040, and may thus, determine whether to change the recipe information.

Based on determining that at least one of the second and third cooking steps 1020 and 1030 is related to the fifth cooking step 1050, which is the next cooking step, the electronic device 100 may change the recipe information (T5). For example, the electronic device 100 may change the fifth cooking step 1050 to a fifth' cooking step 1060, and determine models H' and I' as neural network models corresponding to the fifth' cooking step 1060.

The electronic device 100 may identify the fourth cooking step 1040 corresponding to the cooking situation "do DD" and the fifth' cooking step 1060, which is the next cooking step after the fourth cooking step 1040 (T6).

The electronic device 100 may sequentially load the models F, G, H', and I', which are the neural network models corresponding to the fourth and fifth' cooking steps 1040 and 1060, in an order of F-G-F-G-H'-I' (T7).

Figure 13:
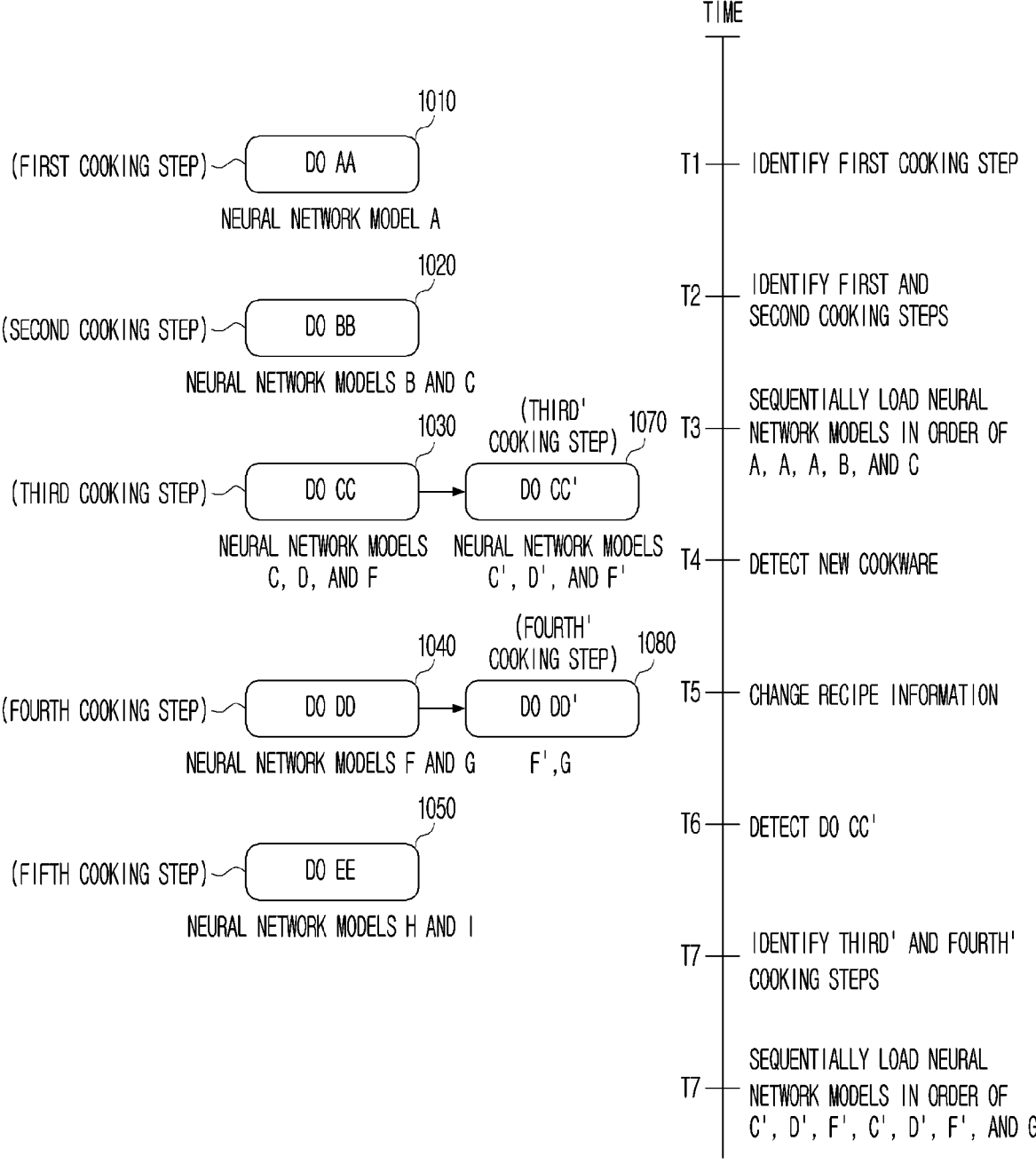

FIG. 13 is a view illustrating an example of detecting the new cookware, according to one or more embodiments of the disclosure. As shown in FIGS. 10 to 12, the recipe information of the cooking menu selected by the user may include the first to fifth cooking steps 1010 to 1050.

First, the electronic device 100 may identify the first cooking step 1010 (T1). For example, the electronic device 100 may identify the first cooking step 1010, which is the first cooking step. Furthermore, the electronic device 100 may identify the second cooking step 1020 after the first cooking step 1010 based on the recipe information. For example, the electronic device 100 may identify the first cooking step 1010 and the second cooking step 1020 (T2).

The electronic device 100 may sequentially load the models A, B, and C, which are the neural network models corresponding to the first and second cooking steps 1010 and 1020, in the order of A-A-A-B-C (T3). In one or more examples, the neural network model A may be the object recognition model that may recognize the cookware.

The electronic device 100 may detect the new cookware while monitoring the context information (T4). For example, the electronic device 100 may detect the new cookware not included in the context information through the neural network model A.

The electronic device 100 may change the recipe information (T5). For example, the electronic device 100 may change the third cooking step 1030 related to the new cookware to a third' cooking step 1070, and the fourth cooking step 1040 to a fourth' cooking step 1080. In one or more examples, the electronic device 100 may determine models C', D', F' as the neural network models corresponding to the third' cooking step 1070, and the models F' and G as the neural network models corresponding to the fourth' cooking step 1080.

While monitoring the context information, the electronic device 100 may detect the cooking situation "do CC" corresponding to the third' cooking step 1070 (T6).

The electronic device 100 may identify the third' cooking step 1070 corresponding to the cooking situation "do CC" and the fourth' cooking step 1080, which is the next cooking step after the third' cooking step 1070 (T7).

The electronic device 100 may sequentially load the models C', D', F', and G, which are the neural network models corresponding to the third' and fourth' cooking steps 1070 and 1080, in an order of C'-D'-F'-C'-D'-F'-G (T8).

Figure 14:
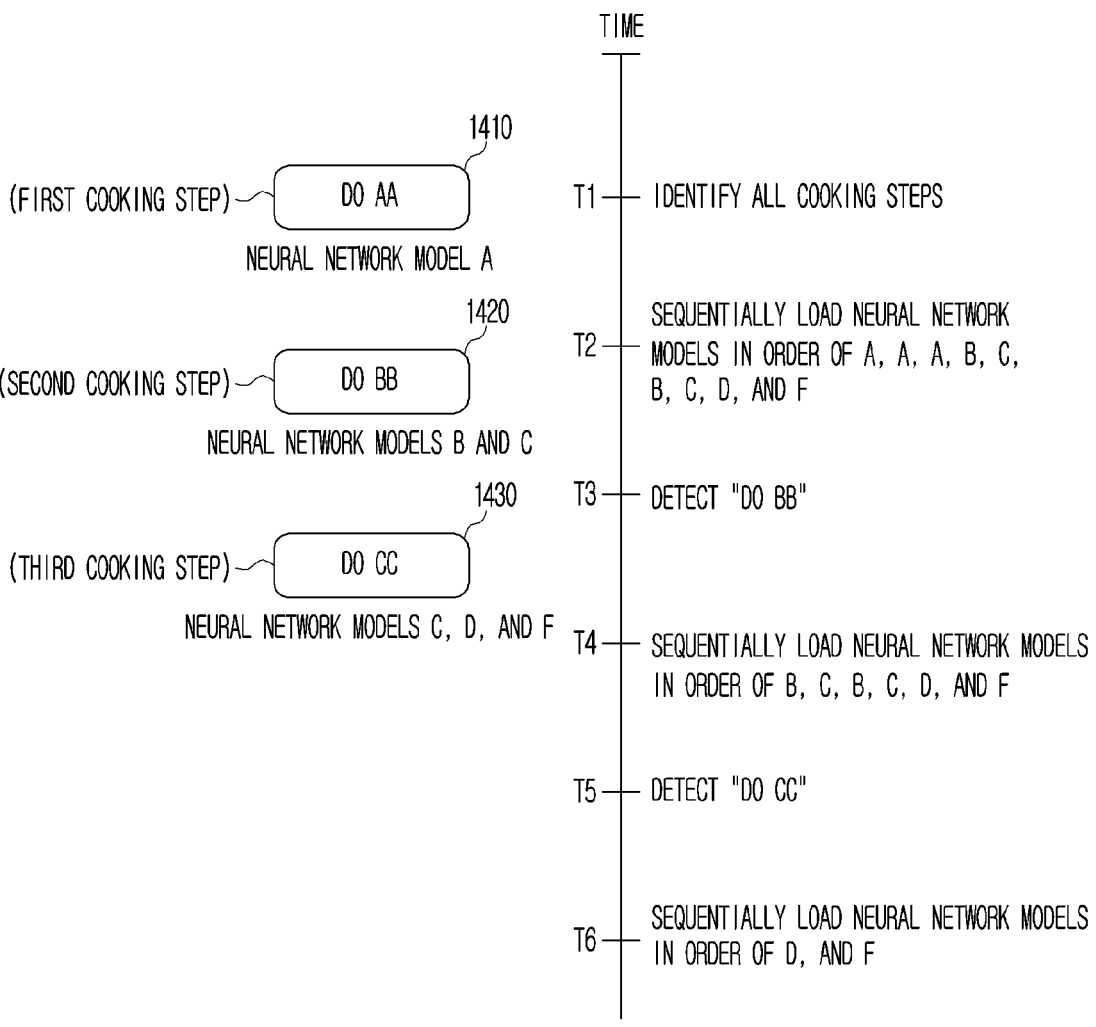

FIG. 14 is a view illustrating an example of reducing the number of loaded neural network models based on the context information after loading the neural network models corresponding to all cooking steps, according to one or more embodiments of the disclosure. The recipe information of the cooking menu selected by the user may include the first to third cooking steps (1410 to 1430). For example, a neural network model for identifying the performance of first cooking step 1410 may be the neural network model A, neural network models for identifying the performance of the second cooking step 1420 may be the neural network models B and C, and neural network models for identifying the performance of the third cooking step 1430 may be the neural network model C, D, and F.

First, the electronic device 100 may identify all cooking steps 1410 to 1430 (T1). For example, the electronic device 100 may initially identify all the cooking steps 1410 to 1430 without identifying a separate cooking step.

Furthermore, the electronic device 100 may sequentially load the plurality of neural network models based on each weight value of the neural network models corresponding to all the cooking steps 1410 to 1430. For example, the electronic device 100 may sequentially load the neural network models in an order of A-A-A-A-B-C-B-C-D-F (T2).

While monitoring the context information, the electronic device 100 may detect the cooking situation "do BB" corresponding to the second cooking step 1420 (T3).

The electronic device 100 may identify a next cooking step after the second cooking step 1420 corresponding to the cooking situation "doing BB," and sequentially load the plurality of neural network models corresponding to the identified cooking steps. For example, the electronic device 100 may sequentially load the neural network models in an order of B-C-B-C-D-G (T4).

While monitoring the context information, the electronic device 100 may detect the cooking situation "do CC" corresponding to the third cooking step 1430 (T5).

The electronic device 100 may sequentially load the plurality of neural network models corresponding to the third cooking step 1430 corresponding to the cooking situation "do CC." For example, the electronic device 100 may sequentially load the neural network models in an order of d-f (T6).

As shown in FIGS. 10 to 14, the electronic device 100 may dynamically load the neural network models based on the context information to obtain the context information as quickly and efficiently as possible by using the neural network models in the on-device environment.

Figure 15:
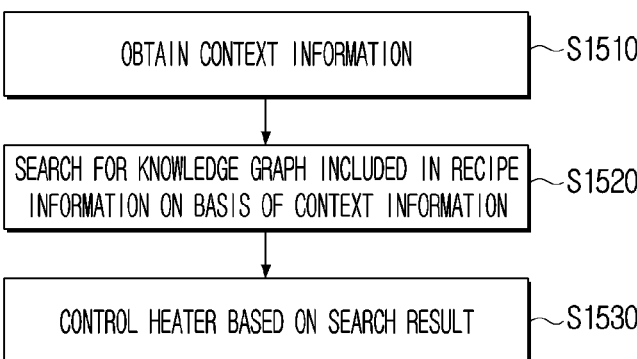
FIG. 15 is a flowchart illustrating an example of controlling an operation of an electronic device based on the context information, according to one or more embodiments of the disclosure.

FIG. 15 is a flowchart illustrating an example of controlling an operation of the electronic device based on the context information according to one or more embodiments of the disclosure.

First, the electronic device 100 may obtain the context information (S1510). In one or more examples, as described in the step S350 of FIG. 3, the context information may be the information on the cooking situation obtained by at least one neural network model. For example, in case that a selected dish is "fried rice dish," the electronic device 100 may obtain that the cookware is a "stainless pen" or a "coated pen" by the neural network model, and the burner on which the cookware is positioned is the "third burner 133."

The electronic device 100 may search the knowledge graph included in the recipe information based on the context information (S1520). For example, the electronic device 100 may search for a node in the knowledge graph corresponding to a cooking step including the context information included in the recipe information. For example, based on obtaining context information on the "stainless steel pen positioned on the third burner 133," the electronic device 100 may search for a node corresponding to "preheat {stainless steel pen} over {medium-high heat for 5 minutes}" and "stir-fry {rice, vegetables} over {medium heat} in {stainless steel pen}", which is the cooking step including information on the "stainless steel pen." In one or more examples, based on obtaining context information on the "coated pen positioned on the third burner 133," the electronic device 100 may search for a node corresponding to "preheat {coated pen} over {high heat for 30 seconds}" and "stir-fry {rice, vegetables} over {high heat} in {coated pen}", which is the cooking step including information on the "coated pen."

Accordingly, the electronic device 100 may control the heater 130 based on a search result (1530). In one or more examples, the electronic device 100 may identify the burner on which the cookware is positioned based on the context information. Furthermore, the electronic device 100 may identify an operation stage (e.g., one of first to ninth stages) of the heater 130 that corresponds to heat intensity corresponding to the retrieved node, the electronic device 100 may identify operation time of the heater 130 to correspond to operation time corresponding to the retrieved node. Furthermore, the electronic device 100 may control the burner identified to be operated at the identified operation stage during the identified operation time.

For example, based on obtaining the context information on the "stainless steel pen positioned on the third burner 133," the electronic device 100 may control the third burner 133 to be operated for 5 minutes in the "sixth stage" corresponding to the medium-high heat based on the retrieved node "preheat {stainless pen} for {medium-high heat for 5 minutes}." Furthermore, based on obtaining the context information on "put rice and vegetables in the stainless steel pen positioned on the third burner 133," the electronic device 100 may control the third burner 133 to be operated in the "fifth stage" corresponding to the medium heat based on the retrieved node "stir-fry {rice, vegetables} in {stainless steel pen} over {medium heat}." For another example, based on obtaining the context information on the "coated pen positioned on the third burner 133," the electronic device 100 may control the third burner 133 to be operated for 30 seconds in the "eighth step" corresponding to the high heat based on the retrieved node "preheat {coated pen} for {high heat for 30 seconds}." Furthermore, based on obtaining the context information on "put rice and vegetables in the coated pen positioned on the third burner 133," the electronic device 100 may control the third burner 133 to be operated in the "eighth stage" corresponding to the high heat based on the retrieved node "stir-fry {rice, vegetables} in {coated pen} over {high heat}."

In one or more examples, based on obtaining the context information "color of onion becomes transparent" through the object recognition model while performing the cooking step of "stir-fry onion until transparent," the electronic device 100 may determine that the retrieved node "stir-fry onion until transparent" is completed, and control the heater 130 to stop the operation of the electronic device 100 or lower the temperature.

For example, the electronic device 100 may actively control the heater 130 based on the obtained context information.

Furthermore, the plurality of dishes may be performed on at least two of the plurality of burners 131 to 133. Therefore, as a result, the electronic device 100 may identify each position of the burners on which the plurality of cooking are performed, and control the corresponding burners. For example, based on obtaining the context information that the first cooking is performed on the first burner 131 and the second cooking is performed on the second burner 132, the electronic device 100 may control the first burner 131 and the second burner 132 to be differently operated based on the context information and the recipe information.

Furthermore, the electronic device 100 may not only control the operation of the heater 130 based on the context information, but also control an operation of another component (e.g., camera). For example, when identifying a cooking step (e.g., cut vegetables) that requires sensing for the user's operation based on context information, the electronic device 100 may control a position captured by the camera 111 to be changed from the heater 130 to an area (e.g., shelf area) where the user is positioned.

Furthermore, the electronic device 100 may output a guide message for the operation of the electronic device 100 before and after automatically performing the operation of the electronic device 100. For example, before preheating the stainless pen for 5 minutes on the medium-high heat, the electronic device 100 may output the guide message indicating "The stainless pen is to be preheated for 5 minutes on the medium-high heat" through a display or through a speaker 162 or transmit the same to an external terminal device. Furthermore, after preheating the stainless pen on the medium-high heat for 5 minutes, the electronic device 100 may output the guide message indicating "The stainless pen is preheated on the medium-high heat for 5 minutes" through the display or through the speaker 162 or transmit the same to the external terminal device.

In one or more examples, the electronic device 100 may output only the guide message including information on the operation of the electronic device 100 without automatically controlling the operation of the electronic device 100 based on a user setting. For example, in case that an automatic control function is turned off through an application, the electronic device 100 may output only the guide message including the information on the operation of the electronic device 100 without automatically controlling the operation of the electronic device 100.

In one or more examples, the electronic device 100 is described as controlling the operation of the electronic device 100 based on the context information and the recipe information, which is only an example, and the electronic device 100 may control the operation of the electronic device 100 based on the context information.

For example, based on detecting the context information "water is boiling over" through the object recognition model, the electronic device 100 may control the heater 130 to stop the operation of the electronic device 100 regardless of the recipe information.

In the above example, the electronic device 100 is described as controlling the operation of the electronic device 100 or dynamically loading the neural network model based the context information obtained through the neural network model, which is only an example, and the electronic device 100 may be operated externally in conjunction with the user terminal.

Figure 16:
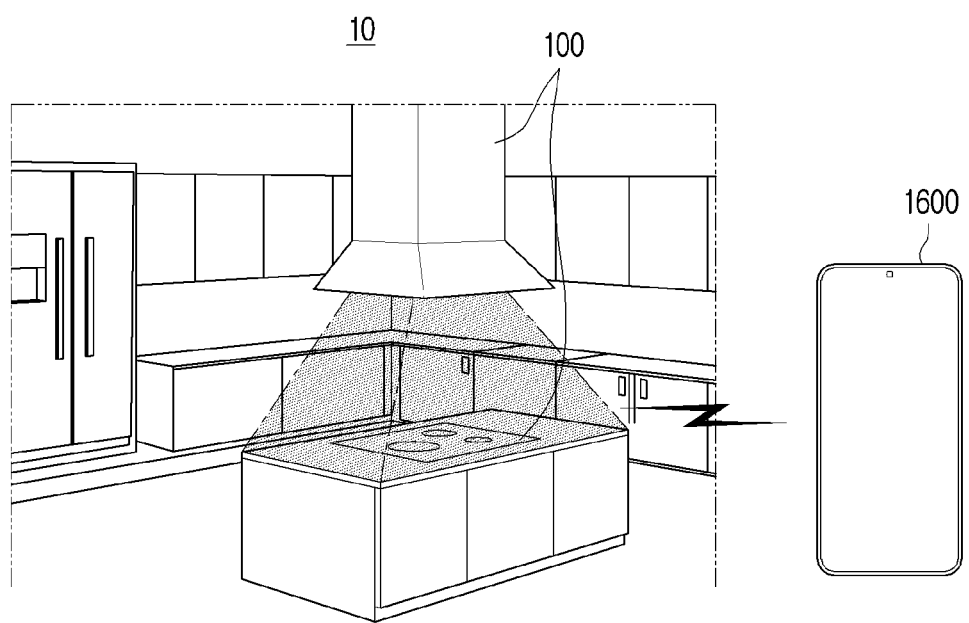
FIG. 16 is a view showing a control system including an electronic device and a user terminal, according to still one or more embodiments of the disclosure.

FIG. 16 is a view showing a control system including an electronic device and a user terminal according to still one or more embodiments of the disclosure. As shown in FIG. 16, a control system 10 may include an electronic device 100 and a user terminal 1600.

In one or more examples, the user terminal 1600 may receive a user command to select a cooking menu, a user command to control an operation of the electronic device 100, a user command to check a current cooking state, or any other user commands known to one of ordinary skill in the art, through an application for controlling the electronic device 100.

The user terminal 1600 may control the operation of the electronic device 100 based on the received user command.

In detail, based on receiving the user command to select a cooking menu, the user terminal 1600 may transmit information on the selected cooking menu to the electronic device 100. The electronic device 100 may obtain recipe information based on the received information on the selected cooking menu. In one or more examples, the user terminal 1600 may transmit the recipe information of the selected cooking menu together with the information on the selected cooking menu.

Figure 17:
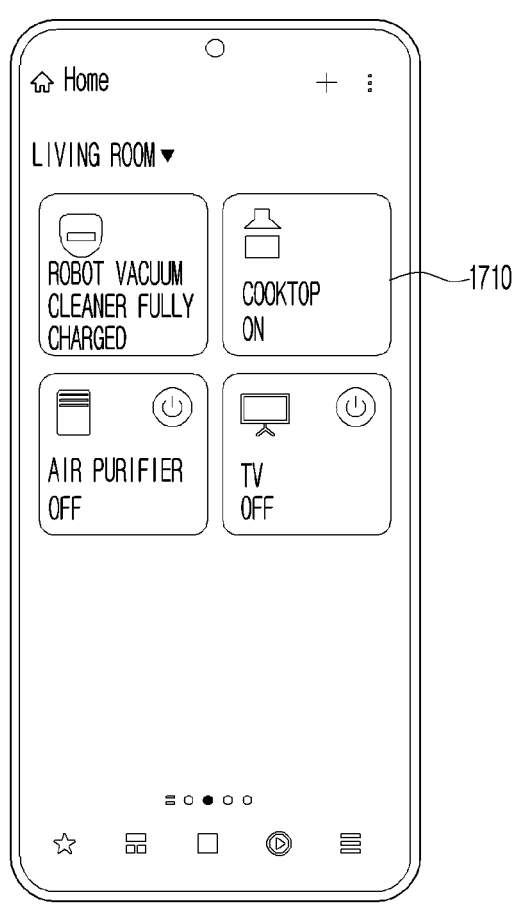
FIGS. 17 and 18 are views each showing a user interface (UI) screen of the user terminal for controlling the electronic device, according to still one or more embodiments of the disclosure.

Furthermore, based on receiving the user command to control an operation of the electronic device 100, the user terminal 1600 may transmit information for controlling the operation of the electronic device 100 to the electronic device 100. For example, an icon 1710 corresponding to the electronic device 100 may be selected while a user interface (UI) screen as shown in FIG. 17 is displayed. Therefore, as a result, the user terminal 1600 may display a control screen for controlling the operation of the electronic device 100. Based on receiving the user command to control the electronic device 100 through the control screen, the user terminal 1600 may transmit information corresponding to the selected command to the electronic device 100. For example, based on receiving a user command to stop an operation of the heater 130, the user terminal 1600 may transmit information including "stop the operation of the heater 130" to the electronic device 100.

Figure 18:
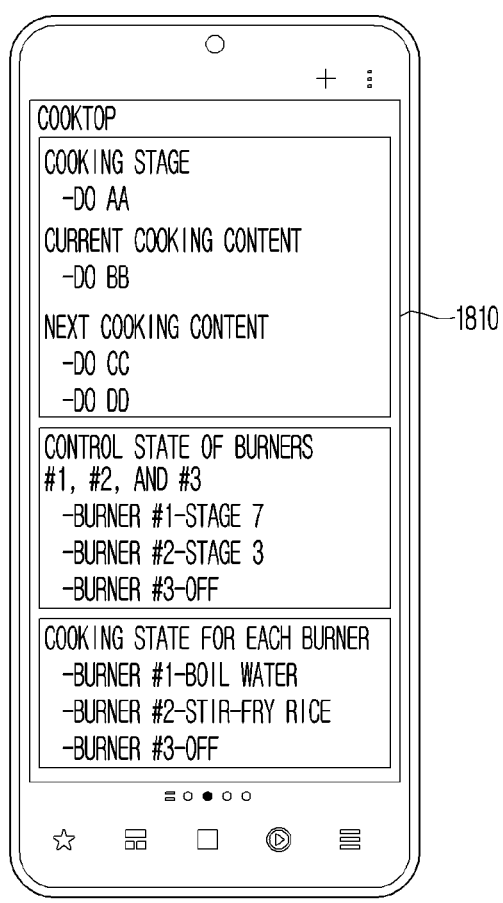

Furthermore, based on receiving the user command to check a current cooking state of the electronic device 100, the user terminal 1600 may transmit a signal for requesting information on the current cooking state to the electronic device 100. Based on receiving the information on the current cooking state from the electronic device 100, the user terminal 1600 may display an UI screen 1810 as shown in FIG. 18 based on the information on the current cooking state received from the electronic device 100. For example, information on a current cooking step, information on a control state of a plurality of burners 131 to 133, and information on the cooking state may be displayed on the UI screen 1810.

In the above example, the electronic device 100 is described as transmitting the information on the current cooking state to the user terminal 1600 when it is determined that the user terminal 1600 transmits the signal for requesting the information on the current cooking state to the electronic device 100. In one or more examples, the electronic device 100 may transmit the information on the current cooking state to the user terminal 1600 at predetermined intervals. In one or more examples, when it is determined that a cooking step end event or a cooking end event may occur, the electronic device 100 may transmit the information on the current cooking state to the user terminal 1600.

As described above, the user may control the electronic device 100 remotely or check the information on the cooking state by controlling the electronic device 100 or checking the current cooking state through the user terminal 1600.

In the above example, a plurality of neural network models are described as being stored in the electronic device 100. In one or more examples, at least some neural network models may be stored in a server 10, and the electronic device 100 may obtain the context information by receiving the neural network model from the server 10.

Figure 19:
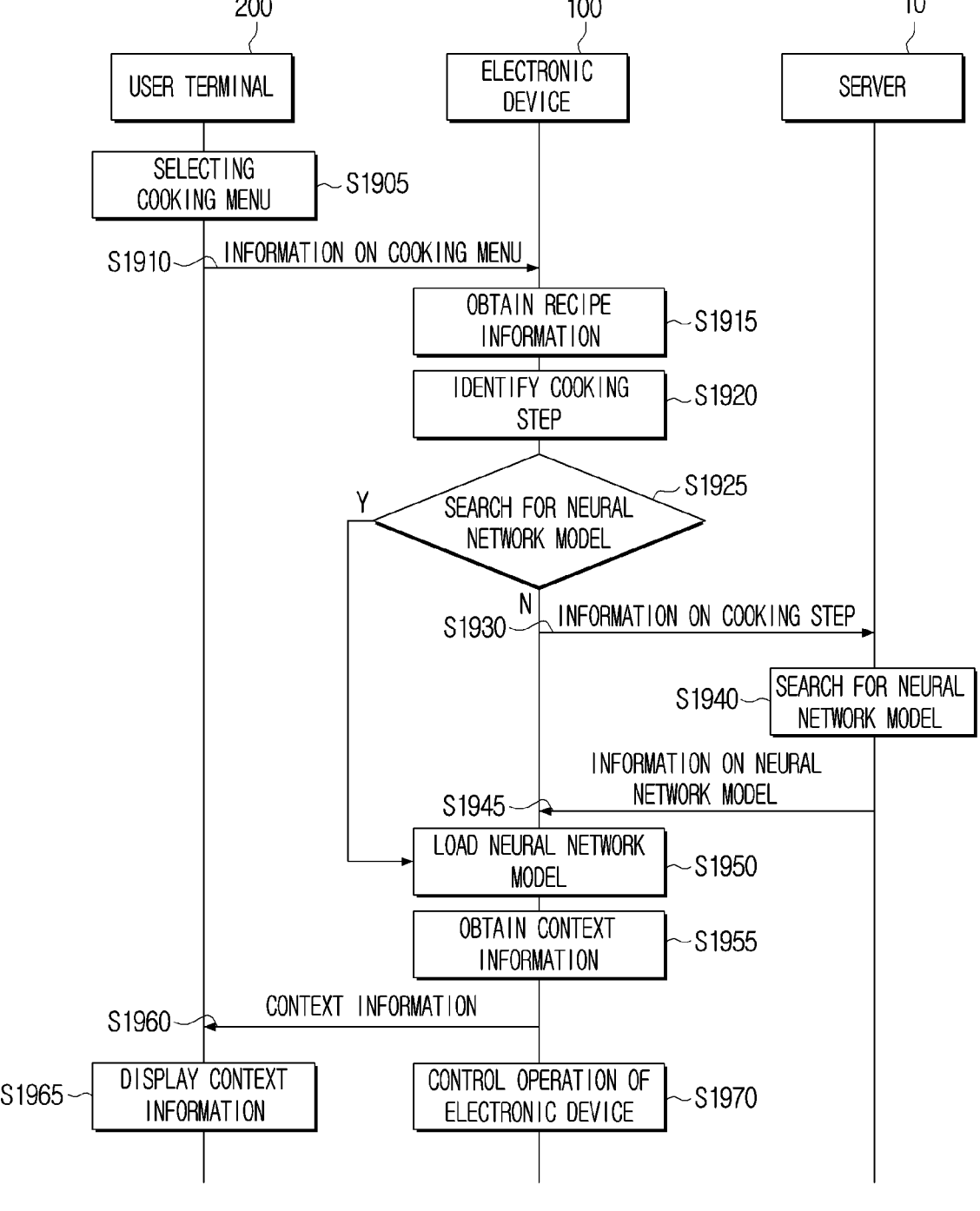
FIG. 19 is a sequence diagram illustrating a controlling method of a system that performs a cooking operation based on context information, according to one or more embodiments of the disclosure.

FIG. 19 is a sequence diagram illustrating a controlling method of a system that performs a cooking operation based on context information, according to one or more embodiments of the disclosure.

First, a user terminal 200 may receive a user input for selecting a cooking menu (S1905). In one or more examples, the user input for selecting the cooking menu may be the user input for directly inputting text for the cooking menu or selecting an icon. In one or more examples, the user input may be the user input that captures identification information (e.g., QR code or barcode) of the cooking menu.

The user terminal 200 may transmit information on the cooking menu to an electronic device 100 (S1910).

The electronic device 100 may obtain recipe information corresponding to the selected cooking menu (S1915). In one or more examples, the electronic device 100 may obtain the recipe information pre-stored in a memory 120, which is only an example, and may receive the recipe information from an external recipe server.

The electronic device 100 may identify a cooking step (S1920). In one or more examples, as shown in FIGS. 3 to 5, the electronic device 100 may identify a first cooking step and at least one cooking step to be performed after the first cooking step.

The electronic device 100 may search for a neural network model stored in the electronic device 100 (S1925). In one or more examples, the electronic device 100 may search for at least one neural network model corresponding to the identified cooking step among the plurality of pre-stored neural network models based on information on the first cooking step and at least one cooking step to be performed after the first cooking step. In one or more examples, the information on the first cooking step and at least one cooking step to be performed after the first cooking step may include information on {food ingredient}, {cookware}, and {action} included in a node corresponding to each cooking step.

Based on failing to retrieve the neural network model for identifying the first cooking step and at least one cooking step to be performed after the first cooking step (S1925—N), the electronic device 100 may transmit information on the cooking step to the server 10 (S1930). In one or more examples, the electronic device 100 may transmit, to the server 10, the information on the first cooking step and at least one cooking step to be performed after the first cooking step. In one or more examples, the electronic device 100 may transmit the identification information, resource information, and surrounding environment information (e.g., illuminance value) of the current electronic device 100 together.

The server 10 may search for the neural network model based on the received information (S1940). In one or more examples, the server 10 may search for at least one neural network model which may output data matching information on the {food ingredient}, the {cookware}, and the {action} included in the node corresponding to first cooking step and at least one cooking step to be performed after the first cooking step. Furthermore, the server 10 may search for at least one neural network model having a resource or performance, corresponding to the electronic device 100 based on the identification information, resource information, and surrounding environment information of the electronic device 100.

The server 10 may transmit information on the retrieved neural network model to the electronic device 100 (S1945).

Based on retrieving the neural network model (S1925—Y) or receiving the information on the retrieved neural network model from the server 10 (S1945), the electronic device 100 may load the neural network model (S1950). In one or more examples, the electronic device 100 may load at least one of at least one neural network model retrieved from the electronic device 100 or at least one neural network model received from the server 10. In one or more examples, as shown in FIG. 6, the electronic device 100 may simultaneously or sequentially load at least one neural network model.

The electronic device 100 may obtain context information (S1955). For example, the electronic device 100 may obtain the context information on a current cooking situation by inputting sensing data to at least one loaded neural network model.

The electronic device 100 may transmit the context information to the user terminal 200 (1960), and the user terminal 200 may display the context information (S1965). For example, the user terminal 200 may display the context information through a user interface (UI) 1810 as shown in FIG. 18.

The electronic device 100 may then control an operation of the electronic device 100 based on the context information (S1970). For example, as shown in FIG. 15, the electronic device 100 may control the operation of the electronic device 100 based on the context information.

Functions of the electronic device 100 that are related to artificial intelligence technology, according to the disclosure, may be operated through the processor and memory of the electronic device 100.

The processor may include one or more processors. In one or more examples, the one or more processors may include at least one of a central processing unit (CPU), a graphic processing unit (GPU), or a neural processing unit (NPU), and is not limited to the examples of the processors described above.

The CPU may be a general-purpose processor that may perform not only a general operation but also an artificial intelligence operation, and may efficiently execute complex programs through a multi-layered cache structure. The CPU may be advantageous for a serial processing method that enables organic linkage between a previous operation result and the next operation result through sequential operation. The general-purpose processor is not limited to the above-described example, unless specified as the above-mentioned CPU.

The GPU may be a processor for large-scale operations such as floating-point operations used for graphics processing, and may perform the large-scale operations in parallel by integrating a large number of cores. In particular, the GPU may be advantageous for a parallel processing method such as a convolution operation or the like compared to the CPU. Furthermore, the GPU may be used as a co-processor to supplement the function of the CPU. The processor for the large-scale operations is not limited to the above-described example, unless specified as the above-mentioned GPU.

The NPU is a processor specialized for artificial intelligence operation using an artificial neural network, and each layer included in the artificial neural network may be implemented in hardware (e.g., silicon). In one or more examples, the NPU is specially designed based on requirements of a company, and may have a lower degree of freedom than the CPU or the GPU. However, the NPU may efficiently process the artificial intelligence operation required by the company. As the processor specialized for the artificial intelligence operation, the NPU may be implemented in various forms such as a tensor processing unit (TPU), an intelligence processing unit (IPU), a vision processing unit (VPU), etc. The artificial intelligence processor is not limited to the above-described example, unless specified as the above-mentioned NPU.

Furthermore, one or more processors may be implemented in a system on chip (SoC). In one or more examples, the SoC may further include a memory and a network interface such as a bus for data communication between the processor and the memory in addition to one or more processors.

When the system on chip (SoC) included in the electronic device includes a plurality of processors, the electronic device may use some of the plurality of processors to perform the artificial intelligence operation (e.g., operation related to the learning or inference of an artificial intelligence model). For example, the electronic device may perform the artificial intelligence operation by using at least one of the GPU, NPU, VPU, TPU, or a hardware accelerator that is specialized for the artificial intelligence operation such as convolution operation and matrix multiplication operation among the plurality of processors. However, in one or more examples, the artificial intelligence operation may be processed using the general-purpose processor such as the CPU.

Furthermore, the electronic device may perform operation for a function related to the artificial intelligence by using multi-cores (e.g., dual-core or quad-core) included in one processor. For example, the electronic device may perform the artificial intelligence operation such as the convolution operation and matrix multiplication operation in parallel using the multi-cores included in the processor.

One or more processors may control input data to be processed based on a predefined operation rule or the artificial intelligence model stored in the memory. The predefined operation rule or the artificial intelligence model may be obtained by learning.

In one or more examples, "obtained by learning" may represent that the predefined operation rule or artificial intelligence model of a desired feature is obtained by applying a learning algorithm to a lot of learning data. Such learning may be performed on the device itself on which the artificial intelligence is performed according to the disclosure, or by a separate server/system.

The artificial intelligence model may include a plurality of neural network layers. At least one layer has at least one weight value, and an operation of the layer may be performed through an operation result of a previous layer and at least one defined operation. The neural networks may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, and a transformer. However, the neural network of the disclosure is not limited to the above-described examples, unless specified otherwise.

The learning algorithm is a method of training a predetermined target device (e.g., robot) by using a large number of learning data for the predetermined target device to make a decision or a prediction for itself. The learning algorithms may include, for example, a supervised learning algorithm, an unsupervised learning algorithm, a semi-supervised learning algorithm, or a reinforcement learning algorithm. However, the learning algorithm of the disclosure is not limited to the above-described examples, unless specified otherwise.

The method according to the various embodiments may be provided by being included in a computer program product. The computer program product may be traded as a product between a seller and a purchaser. The computer program product may be distributed in the form of a storage medium (for example, a compact disc read only memory (CD-ROM)) that may be read by a machine, or may be distributed online (for example, downloaded or uploaded) through an application store (e.g., PlayStore™) or directly between two user devices (for example, smartphones). Based on the online distribution, at least a part of the computer program product (e.g., downloadable app) may be at least temporarily stored in a machine-readable storage medium such as a memory of a server of a manufacturer, a server of an application store or a relay server, or be temporarily provided.

The various embodiments of the disclosure may be implemented in software including an instruction stored in the machine-readable storage medium (for example, the computer-readable storage medium). The machine may be a device that invokes the stored instruction from the storage medium and may be operated based on the invoked instruction, and may include the electronic device (for example, a television) according to the disclosed embodiments.

The machine-readable storage medium may be provided in the form of a non-transitory storage medium. In one or more examples, the "non-transitory storage medium" may refer to a tangible device and only represent that this storage medium does not include a signal (e.g., an electromagnetic wave), and this term does not distinguish a case where data is semi-permanently stored in the storage medium and a case where data is temporarily stored in the storage medium from each other. For example, the "non-transitory storage medium" may include a buffer in which data is temporarily stored.

In case that the instruction is executed by the processor, the processor may directly perform a function corresponding to the instruction or other components may perform the function corresponding to the instruction under a control of the processor. The instruction may include codes provided or executed by a compiler or an interpreter.

Although example embodiments of the disclosure have been shown and described, the disclosure is not limited to the specific embodiments described above, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:

at least one sensor;

a first memory storing a plurality of neural network models and one or more instructions; and at least one processor comprising a second memory, the at least one processor operatively coupled to the first memory, wherein the one or more instructions, when executed by the at least one processor, cause the electronic device to:

in response to reception of a user input for selection of a cooking menu, obtain recipe information corresponding to the cooking menu, identify, from among a plurality of cooking steps included in the recipe information, a first cooking step and at least one cooking step to be performed after the first cooking step, load from the first memory into the second memory, based on the recipe information and a resource of the electronic device, at least one first neural network model among the plurality of neural network models, the at least one first neural network model corresponding to the first cooking step and the at least one cooking step to be performed after the first cooking step, obtain sensing data from the at least one sensor, the sensing data corresponding to at least the first cooking step, obtain context information on a cooking situation indicated in the sensing data by inputting the sensing data to the at least one first neural network model, control an operation of the electronic device based on the recipe information and the context, detect a neural network model change event based on the context information, and in response to detection of the neural network model change event, load, from the first memory into the second memory, at least one second neural network model among the plurality of neural network models based on the context information and resource information of the electronic device, wherein the one or more instructions, when executed by the at least one processor, further cause the electronic device to, in response to a determination that a plurality of first neural network models exist:

identify a resource required to execute each of the plurality of first neural network models, and determine a number of neural network models among the plurality of first neural network models to be simultaneously loaded, based on the resource of the electronic device and the resource required to execute each of the plurality of first neural network models, wherein each first neural network model of the plurality of first neural network models corresponds to the first cooking step and the at least one cooking step to be performed after the first cooking step, and wherein the plurality of first neural network models are included in the plurality of neural network models.

2. The device as claimed in claim 1, wherein the neural network model change event corresponds to an event in which performance of a second cooking step different from the first cooking step is detected, and wherein the one or more instructions, when executed by the at least one processor, further cause the electronic device to:

identify, based on the context information, the second cooking step and the at least one cooking step to be performed after the second cooking step among the plurality of cooking steps included in the recipe information, and load from the first memory into the second memory, based on the recipe information and the resource of the electronic device, the at least one second neural network model among the plurality of neural network models, the at least one second neural network model corresponding to the second cooking step and the at least one cooking step to be performed after the second cooking step.

3. The device as claimed in claim 2, wherein, the one or more instructions, when executed by the at least one processor, further cause the electronic device to:

determine whether to change the recipe information based on the context information and the recipe information, in response to determining that the recipe information is changed, obtain changed recipe information, identify a third cooking step and the at least one cooking step to be performed after the third cooking step among the plurality of cooking steps included in the changed recipe information, based on the context information, and load from the first memory into the second memory, based on the changed recipe information and the resource of the electronic device, at least one third neural network model among the plurality of neural network models, the at least one third neural network model corresponding to the third cooking step and the at least one cooking step to be performed after the third cooking step.

4. The device as claimed in claim 3, wherein the one or more instructions, when executed by the at least one processor, further cause the electronic device to:

determine whether an intermediate cooking step exists between the first cooking step and the second cooking step, in response to determining that no intermediate cooking step exists between the first cooking step and the second cooking step, determine that the recipe information is not changed, in response to determining that the intermediate cooking step exists between the first cooking step and the second cooking step, determine whether the intermediate cooking step between the first cooking step and the second cooking step is a cooking step related to a next cooking step after the second cooking step, and in response to determining that the intermediate cooking step between the first cooking step and the second cooking step is the cooking step related to the next cooking step after the second cooking step, determine that the recipe information is changed.

5. The device as claimed in claim 1, wherein the neural network model change event corresponds to detection of a new cookware not included in the recipe information, and wherein the one or more instructions, when executed by the at least one processor, further cause the electronic device to:

based on the detection of the new cookware not included in the recipe information, change the recipe information based on the new cookware, and load from the first memory to the second memory, based on the changed recipe information and the resource of the electronic device, at least one fourth neural network model among the plurality of neural network models, the at least one fourth neural network model corresponding to a fourth cooking step and the at least one cooking step to be performed after the fourth cooking step.

6. The device as claimed in claim 1, wherein the one or more instructions, when executed by the at least one processor, further cause the electronic device to:

identify the first cooking step included in the recipe information, obtain information on a probability that one or more cooking steps are performed after the first cooking step based on the recipe information, and identify the at least one cooking step among next cooking steps after the first cooking step, based on the information on the probability that the one or more cooking steps are performed after the first cooking step.

7. The device as claimed in claim 6, wherein the recipe information includes a knowledge graph showing a recipe corresponding to the selected cooking menu, wherein the knowledge graph includes a plurality of nodes representing the plurality of cooking steps for completing the cooking menu based on the recipe and a plurality of edges representing a sequential relationship between the plurality of cooking steps, and wherein the one or more instructions, when executed by the at least one processor, further cause the electronic device to obtain the information on the probability that the one or more cooking steps are performed after the first cooking step based on a distance between a node representing the first cooking step and nodes representing the next cooking steps after the first cooking step.

8. The device as claimed in claim 1, wherein the one or more instructions, when executed by the at least one processor, further cause the electronic device to:

determine a weight value of each of the plurality of first neural network models based on the information on a probability that the at least one cooking step is performed after the first cooking step;

sequentially load, from the first memory into the second memory, each of the plurality of first neural network models based on the determined weight values; and obtain the context information on the cooking situation indicated in the sensing data by inputting the sensing data to the plurality of sequentially loaded first neural network models.

9. The device as claimed in claim 1, wherein the at least one sensor comprises an illuminance sensor for sensing an illuminance value around the electronic device, and wherein the one or more instructions, when executed by the at least one processor, further cause the electronic device to load, from the first memory into the second memory, the at least one first neural network model among the plurality of neural network models, the at least one first neural network model corresponding to the first cooking step and the at least one cooking step to be performed after the first cooking step, based on at least one of a type of the at least one sensor and the illuminance value obtained from the illuminance sensor.

10. A method of controlling an electronic device, the method comprising:

in response to receiving a user input selecting a cooking menu, obtaining recipe information corresponding to the cooking menu;

identifying, from among a plurality of cooking steps included in the recipe information, a first cooking step and at least one cooking step to be performed after the first cooking step;

loading, based on the recipe information and a resource of the electronic device, at least one first neural network model among a plurality of neural network models from a first memory of the electronic device into a second memory of at least one processor of the electronic device, the at least one first neural network model corresponding to the first cooking step and the at least one cooking step to be performed after the first cooking step;

obtaining sensing data from at least one sensor, the sensing data corresponding to at least the first cooking step;

obtaining context information on a cooking situation indicated in the sensing data by inputting the sensing data to the at least one first neural network model;

controlling an operation of the electronic device based on the recipe information and the context information;

detecting a neural network model change event based on the context information; and in response to detection of the neural network model change event, loading, from the first memory into the second memory, at least one second neural network model among the plurality of neural network models based on the context information and resource information of the electronic device, wherein the loading the at least one first neural network model comprises, in response to a determination that a plurality of first neural network models exist:

identifying a resource required to execute each of the plurality of first neural network models, and determining a number of neural network models among the plurality of first neural network models to be simultaneously loaded, based on the resource of the electronic device and the resource required to execute each of the plurality of first neural network models, wherein each first neural network model of the plurality of first neural network models corresponds to the first cooking step and the at least one cooking step to be performed after the first cooking step, and wherein the plurality of first neural network models are included in the plurality of neural network models.

11. The method as claimed in claim 10, wherein the neural network model change event corresponds to an event in which performance of a second cooking step different from the first cooking step is detected, and wherein the loading of the at least one second neural network model comprises:

identifying, based on the context information, the second cooking step and the at least one cooking step to be performed after the second cooking step among the plurality of cooking steps included in the recipe information; and loading from the first memory into the second memory, based on the recipe information and the resource of the electronic device, the at least one second neural network model among the plurality of neural network models, the at least one second neural network model corresponding to the second cooking step and the at least one cooking step to be performed after the second cooking step.

12. The method as claimed in claim 11, wherein the loading the at least one second neural network model comprises:

determining whether to change the recipe information based on the context information and the recipe information;

in response to determining that the recipe information is changed, obtaining changed recipe information;

identifying, based on the context information, a third cooking step and the at least one cooking step to be performed after the third cooking step among the plurality of cooking steps included in the changed recipe information; and loading from the first memory into the second memory, based on the changed recipe information and the resource of the electronic device, at least one third neural network model among the plurality of neural network models, the at least one third neural network model corresponding to the third cooking step and the at least one cooking step to be performed after the third cooking step.

13. The method as claimed in claim 12, wherein the determining whether to change the recipe information comprises:

determining whether an intermediate cooking step exists between the first cooking step and the second cooking step;

in response to determining that no intermediate cooking step exists between the first cooking step and the second cooking step, determining that the recipe information is not changed;

in response to determining that the intermediate cooking step exists between the first cooking step and the second cooking step, determining whether the intermediate cooking step between the first cooking step and the second cooking step is a cooking step related to a next cooking step after the second cooking step; and in response to determining that the cooking step between the first cooking step and the second cooking step is the cooking step related to the next cooking step after the second cooking step, determining that the recipe information is changed.

14. The method as claimed in claim 10, wherein the neural network model change event corresponds to a detection of a new cookware not included in the recipe information, and wherein the loading the at least one second neural network model comprises:

in response to the detection of the new cookware not included in the recipe information, changing the recipe information based on the new cookware; and loading from the first memory into the second memory, based on the changed recipe information and the resource of the electronic device, at least one fourth neural network model among the plurality of neural network models, the at least one fourth neural network model corresponding to a fourth cooking step and the at least one cooking step to be performed after the fourth cooking step.

15. An electronic device comprising:

at least one sensor;

a first memory storing a plurality of neural network models and one or more instructions; and at least one processor comprising a second memory, the at least one processor operatively coupled to the first memory, wherein the one or more instructions, when executed by the at least one processor, cause the electronic device to:

in response to reception of a user input selecting a cooking menu, obtain recipe information corresponding to the cooking menu, identify a first cooking step and at least one cooking step to be performed after the first cooking step among a plurality of cooking steps included in the recipe information, load from the first memory into the second memory, based on the recipe information and a resource of the electronic device, at least one first neural network model among the plurality of neural network models, the at least one first neural network model corresponding to the first cooking step and the at least one cooking step to be performed after the first cooking step, obtain sensing data from the at least one sensor, the sensing data corresponding to the first cooking step, obtain context information on a cooking situation indicated in the sensing data by inputting the sensing data to the at least one first neural network model, control an operation of the electronic device based on the recipe information and the context information, wherein the one or more instructions, when executed by the at least one processor, further cause the electronic device to, in response to a determination that a plurality of first neural network models exist:

identify a resource required to execute each of the plurality of first neural network models, and determine a number of neural network models among the plurality of first neural network models to be simultaneously loaded, based on the resource of the electronic device and the resource required to execute each of the plurality of first neural network models, wherein each first neural network model in the plurality of first neural network models corresponds the first cooking step and the at least one cooking step to be performed after the first cooking step, and wherein the plurality of first neural network models are included in the plurality of neural network models.

16. The device as claimed in claim 15, wherein the one or more instructions, when executed by the at least one processor, further cause the electronic device to:

identify the first cooking step included in the recipe information, obtain information on a probability that one or more cooking steps are performed after the first cooking step based on the recipe information, and identify, based on the information on the probability that the one or more cooking steps are performed after the first cooking step, the at least one cooking step among next cooking steps after the first cooking step.

17. The device as claimed in claim 16, wherein the recipe information includes a knowledge graph showing a recipe corresponding to the selected cooking menu, wherein the knowledge graph includes a plurality of nodes representing the plurality of cooking steps for completing the cooking menu based on the recipe and a plurality of edges representing a sequential relationship between the plurality of cooking steps, and wherein the one or more instructions, when executed by the at least one processor, further cause the electronic device to obtain the information on the probability that the one or more cooking steps are performed after the first cooking step based on a distance between a node representing the first cooking step and nodes representing the next cooking steps after the first cooking step.

18. The device as claimed in claim 15, wherein the one or more instructions, when executed by the at least one processor, further cause the electronic device to:

determine a weight value of each of the plurality of first neural network models based on information on a probability that the at least one cooking step is performed after the first cooking step;

sequentially load, from the first memory into the second memory, each of the plurality of first neural network models based on the determined weight values; and obtain the context information on the cooking situation indicated in the sensing data by inputting the sensing data to the plurality of sequentially loaded first neural network models.

* * * * *